(12) United States Patent
Tanamoto et al.

(10) Patent No.: US 9,712,166 B2
(45) Date of Patent: Jul. 18, 2017

(54) DATA GENERATING DEVICE AND AUTHENTICATION SYSTEM

(71) Applicant: KABUSHIKI KAISHA TOSHIBA, Minato-ku (JP)

(72) Inventors: Tetsufumi Tanamoto, Kawasaki (JP); Shinichi Yasuda, Setagaya (JP); Shinobu Fujita, Inagi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/068,794

(22) Filed: Mar. 14, 2016

(65) Prior Publication Data

US 2016/0277025 A1   Sep. 22, 2016

(30) Foreign Application Priority Data

Mar. 17, 2015 (JP) ................................. 2015-053325

(51) Int. Cl.
*H03K 17/00* (2006.01)
*G06F 7/58* (2006.01)
*H03K 19/003* (2006.01)

(52) U.S. Cl.
CPC ................... *H03K 19/003* (2013.01)

(58) Field of Classification Search
CPC .................................................. H03K 19/003
USPC ................... 326/8; 331/57; 708/251
See application file for complete search history.

(56) References Cited

U.S. PATENT DOCUMENTS

| 6,760,472 | B1 | 7/2004 | Takeda et al. |
| 7,516,169 | B2* | 4/2009 | Collier .................... G06F 7/582 |
| | | | 708/251 |
| 7,797,361 | B2 | 9/2010 | Lazich et al. |
| 8,583,710 | B2 | 11/2013 | Bucci et al. |
| 2008/0122546 | A1 | 5/2008 | Shiramizu et al. |
| 2012/0002045 | A1 | 1/2012 | Tony et al. |
| 2013/0082733 | A1 | 4/2013 | Shimizu |
| 2013/0202107 | A1 | 8/2013 | Danger |
| 2014/0143292 | A1 | 5/2014 | Yasuda et al. |
| 2014/0244702 | A1* | 8/2014 | Karpinskyy ............ G06F 7/588 |
| | | | 708/251 |

(Continued)

FOREIGN PATENT DOCUMENTS

JP     2000-156629 A    6/2000
JP     2000-235636 A    8/2000

(Continued)

OTHER PUBLICATIONS

Jorge Guajardo, et al., "FPGA Intrinsic PUFs and Their Use for IP Protection" CHES 2007, LNCS, vol. 4727/2007, 2007, pp. 63-80.

(Continued)

*Primary Examiner* — Daniel D Chang
(74) *Attorney, Agent, or Firm* — Oblon, McClelland, Maier & Neustadt, L.L.P.

(57) ABSTRACT

A data generating device according to embodiments comprises a ring oscillator, a flip-flop circuit and a generator. The flip-flop circuit includes a first terminal and a second terminal to each of which the ring oscillator output is inputted, and that determines a value of output of the ring oscillator. The generator generates an ID for authentication based on one or more values determined by the flip-flop circuit at the time when the ring oscillator is turned on.

21 Claims, 22 Drawing Sheets

(56) References Cited

U.S. PATENT DOCUMENTS

| | | | |
|---|---|---|---|
| 2014/0250160 A1* | 9/2014 | Ihor | H03K 3/84 708/251 |
| 2014/0372671 A1 | 12/2014 | Tanamoto et al. | |
| 2016/0085961 A1 | 3/2016 | Tanamoto et al. | |
| 2016/0188908 A1 | 6/2016 | Chen et al. | |

FOREIGN PATENT DOCUMENTS

| | | |
|---|---|---|
| JP | 2006-139756 A | 6/2006 |
| JP | 2008-17007 A | 1/2008 |
| JP | 2012-73954 A | 4/2012 |
| JP | 2013-534062 A | 8/2013 |
| JP | 2014-102768 A | 6/2014 |
| JP | 2015-1761 A | 1/2015 |
| JP | 2015-61201 A | 3/2015 |
| JP | 2015-127757 A | 7/2015 |
| JP | 2016-63457 A | 4/2016 |
| JP | 2016-126482 A | 7/2016 |
| WO | WO2011/155011 A1 | 12/2011 |

OTHER PUBLICATIONS

Lawrence R. Rabiner "A Tutorial on Hidden Markov Models and Selected Applications in Speech Recognition" Proceedings of the IEEE, vol. 77, No. 2, Feb. 1989, pp. 257-286.

Daniel E. Holcomb, et al., "Power-Up SRAM State as an Identifying Fingerprint and Source of True Random Numbers" IEEE Transactions on Computers, vol. 58, No. 9, Sep. 2009, pp. 1198-1210.

* cited by examiner

```
FFFFFFFFFFFDFFF
0000180300003801
0000000000000000
0000600000401800
0380300100C00801
01803FFFC0600FFE
0400000400800001
0000000300200003
0020000100600001
C7FFFF87F1FFFFFD
8000000080000001
01802003C0E01E01
FFFFFFFFFFFFFFFF
007C000100700003
0180300000600800
0008010000180400
```

FIG.13
```
FE63B1C1F31CD30F
0000F03F0003FC01
B032DF3B83227098
18CE27C44210CE30
7EFE3005FE4D3133
338CC260E6388630
881F830220E6CE67
03F0703E8F80C47D
4A69E95A5D3D2BC3
F01C0CFC701C08FE
FE3C71C3F8F0C30F
11F1E1F0CF0F0E1D
33E3719B8E399DC6
C1FFC3E0C3FFE7F1
03F1FC000FCFF001
03FFFFE00FDFFE00
```
FIG.14
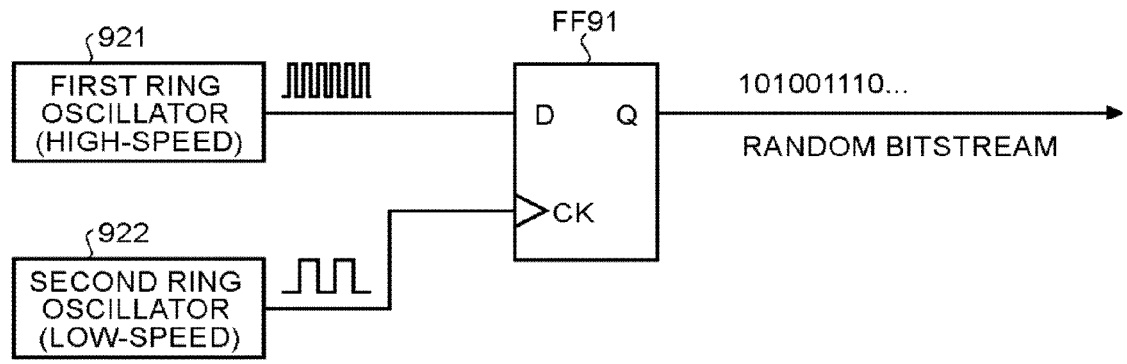
FIG.15
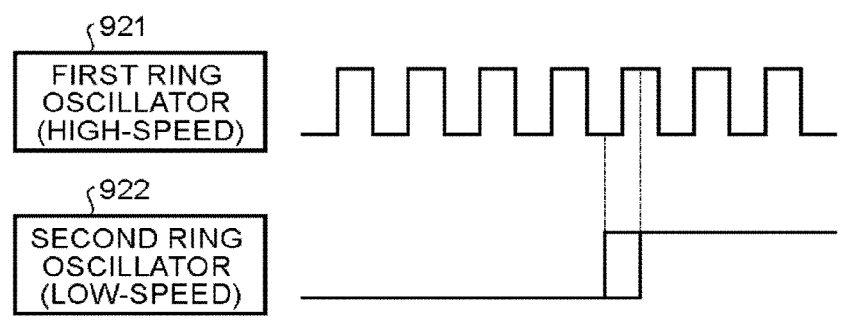

FOR USE IN PUF ←→ FOR RANDOM NUMBERS

FOR USE IN PUF ←→ FOR RANDOM NUMBERS

DATA GENERATING DEVICE AND AUTHENTICATION SYSTEM

CROSS-REFERENCE TO RELATED APPLICATIONS

This application is based upon and claims the benefit of priority from Japanese Patent Application No. 2015-053325, filed on Mar. 17, 2015; the entire contents of which are incorporated herein by reference.

FIELD

Embodiments described herein relate generally to a data generating device and an authentication device.

BACKGROUND

In recent years, with the enhancement achieved in the communication speed and the progress made in cloud computing, there has been a sudden expansion in the use of near field communication (NFC). Typically, the NFC is implemented in IC cards such as cash cards or credit cards; in the electronic money facility provided in smartphones; and in smart cards used as bus tickets or railway tickets. As far as the NFC is concerned, the issue has been to strengthen the security in regard to the ID identification function that enables identification of individual persons.

Besides, in recent years, even the memory cards that were typically used only to store personal data are also increasingly being equipped with the ID identification function. That has led to the technical issue of providing a sophisticated ID identification function in handheld devices.

With that background, research and development has been going on about using the variability in each individual device as the "chip fingerprint". Such technology is known as a physically unclonable function (PUF).

From among the types of PUF, the PUF that is most researched at present is SRAM-PUF (SRAM stands for static random access memory). The SRAM-PUF represents the technology for using the variability that exists while manufacturing two inverters constituting an SRAM. Particularly, the RAM-PUF[1-3] that is most popular is implemented in the security IP and IC cards mentioned above. Moreover, as a proposal for using the initial variability of an electronic device, the application of the PUF to a nonvolatile memory is also being studied.

It is an object of the embodiments described below to provide a data generating device and an authentication system in which a PUF is used.

BRIEF DESCRIPTION OF THE DRAWINGS

FIG. 13 is a diagram illustrating an example of PUF data that is actually obtained in the PUF generating circuit according to the fifth embodiment;

FIG. 14 is a diagram illustrating a comparison example of a random number generating circuit;

FIG. 15 is a diagram illustrating examples of oscillation waveforms output from ring oscillators installed in the random number generating circuit illustrated in FIG. 14;

FIG. 22 is a diagram illustrating another example of the PUF generating circuit according to the ninth embodiment;

DETAILED DESCRIPTION

Figure 1:
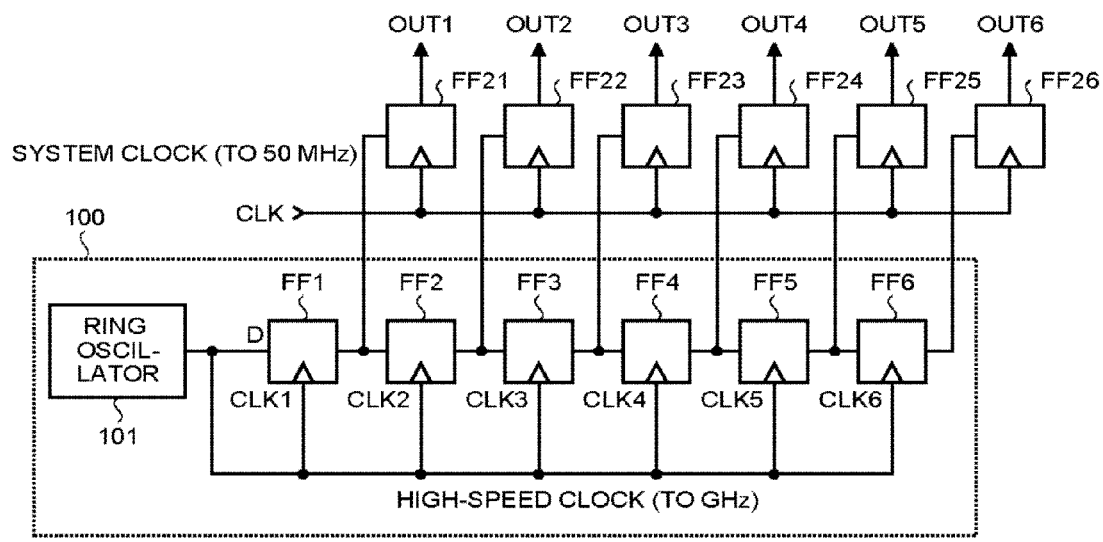
FIG. 1 is a diagram illustrating an example of a physically unclonable function (PUF) generating circuit according to a first embodiment.

Exemplary embodiments of a data generating device and an authentication system are described below in detail with reference to the accompanying drawings.

In one of the types of PUF, a random number source is used (hereinafter, such a PUF is called a random number PUF). The random number PUF has the advantage of being able to use a random number source, such as a random number generating circuit, without modification. Moreover, since the output data of a random number generating circuit represents temporally-continuous data, the random number PUF possesses the characteristic of having correlation among sets of data.

If a PUF is combined with a Fuzzy Extractor (FE) that is capable of stably extracting information from the data including noise, it becomes possible to generate a device-specific key that is difficult to duplicate.

However, since a random number source that is a physical device is used in a PUF, it is likely to be affected by the external physical environment such as temperature or external noise. In that regard, in the embodiments described below, a data generating device and an authentication system are provided that enable achieving reduction in the effect of the external physical environment. In other words, in the embodiments described below, it is possible to achieve a data generating device and an authentication system that include a PUF circuit having excellent robustness against the external environment.

In the common environment, it is not possible to ignore the effect of the environment such as temperature change on the characteristics of the transistors constituting a PUF. In the case in which a plurality of PUF generating circuits installed in a circuit are affected by the same environment, in order to reduce the effect from the outside, it is effective to associate the differences in the characteristics of the PUF generating circuits with the IDs. As far as the method for strengthening the correlation between two circuits, a method is available in which the circuits are coupled using hard-wiring. As a result of making use of the differences in the characteristics of the PUF generating circuits that are coupled using hard-wiring, it becomes possible to reduce the effect of the external environment.

Usually, regarding the commercially-based circuits, the range in which operations are guaranteed is from about −20° C. to about 90° C. Although the circuit operations at around the room temperature can be dealt with according to the method described above, there are times when the behavior of the temperature in the vicinity of −20° C. or in the vicinity of 90° C. cannot be absorbed using the differences among the circuits. In such a case, it is effective to use a temperature sensor. If some memory space is available in the memory of a server, then it is possible to record the PUF IDs corresponding to the temperatures. However, if no memory space is available in the memory of the server, then it is possible to think of a method of recording the value at normal temperature in a static random access memory (SRAM). Herein, normal temperature can represent the range of temperature of 20° C.±15° C. as specified in the Japanese industrial standards (JIS). When the temperature is higher or lower than normal temperature, the SRAM is referred to for the temperature value. Meanwhile, if the temperature is high or low at the time of activating the PUF generating circuits, then the temperature values can be stored in a nonvolatile memory.

First Embodiment

FIG. 1 is a diagram illustrating an example of a PUF generating circuit according to a first embodiment. As illustrated in FIG. 1, a PUF generating circuit 100 according to the first embodiment includes a single ring oscillator 101 and flip-flop circuits FF1 to FF6. The output of the ring oscillator 101 is connected to a D terminal of the flip-flop circuit FF1 and to clock terminals CLK1 to CLK6 of the flip-flop circuits FF1 to FF6, respectively. Moreover, to the output from the flip-flop circuits FF1 to FF6 are connected multistep flip-flop circuits FF21 to FF26, respectively. Of the flip-flop circuits FF1 to FF6, to the D terminal of the flip-flop circuit FF1 is connected the output of the ring oscillator 101. Moreover, a commonly-used system clock CLK can be input to clock terminals CLK21 to CLK26 of the flip-flop circuits FF21 to FF26, respectively.

In a commonly-used random number generating circuit, the system clock is input to the clock terminals of the flip-flop circuits that constitute the random number generating circuit. Usually, the frequency of the system clock is set to be in the range of about 50 MHz to about 100 MHz because of the need to control the entire system. In contrast, the ring oscillator has an extremely high oscillation frequency of several tens of gigahertz even if the delay time of inverters that constitute the circuit is set to several tens of picoseconds. Accordingly, if the system clock is assumed to be set to 100 MHz, the calculation is such that the inverter operations are performed for 1000 or more times during a single clock operation of the system.

Moreover, by taking into account the fact that a PUF makes use of the manufacturing variability in the transistors constituting the circuit as well as makes use of the relative positioning relationship among the transistors, it is believed to be desirable to have a smaller count of the inversion operations of the inverters. That is because, smaller the number of inversion operations of the inverters, greater is the possibility of reducing the effect of external noise. Thus, in the case of a ring-oscillator-based PUF generating circuit, it is desirable that the clocks input to the flip-flop circuits have a short cycle. The fastest cycle is the signal cycle output from the ring oscillator. For that reason, the most desirable configuration is believed to be the one in which the output of the ring oscillator is connected without modification to the terminals (clock terminals) that determine the values of the flip-flop circuits.

In that regard, in the PUF generating circuit 100 illustrated in FIG. 1, the output of the ring oscillator 101 is connected to the terminals of the flip-flop circuits FF1 to FF6. In such a configuration, according to pure mathematics, it is expected that always the same fixed values are obtained. However, because of the presence of the metastable state possessed by the ring oscillator 101 and because of the fact that the hard-wiring till entering the flip-flop circuits cannot be ensured to have the same length and the same thickness in a precise sense; in the initial state after activation of the PUF generating circuit 100, it is possible to obtain a pure variability value of each ring oscillator 101. Herein, the initial state after activation can be, for example, a predetermined period of time elapsed since switching the ring oscillator ON (for example, about 100 cycles in the system clock).

The data acquisition in a PUF is performed by achieving synchronization with the initial rising or the initial falling of the system clock CLK. Typically, a PUF has 128 bits as data bits. Even when the number of data bits is greater than 128 bits, it is equal to or smaller than 1000 bits. Hence, when the system clock CLK is set to 100 MHz and the ring oscillator 101 has the frequency of 2 GHz, it is possible to obtain data (hereinafter, called PUF data) for 20 times. Of the data acquisition performed for 20 times, either the PUF data obtained for the first time of data acquisition can be used in ID generation, or the average value of the PDF data obtained by oscillating the ring oscillator 101 for a plurality of times (for example, twice or thrice) can be used in ID generation.

As another example, when the system clock CLK is set to 100 MHz and the ring oscillator 101 has the frequency of 1 GHz, 10 sets of PUF data can be obtained. In that case, either the PUF data obtained for the first time of data acquisition can be used, or the average value of the PUF data obtained for 10 times can be used, or a majority between "0" and "1" can be taken among the bits and the bits of the greater count can be used. However, the bit length of the required PUF data is dependent on the entire system such as a server.

Second Embodiment

Figure 2:
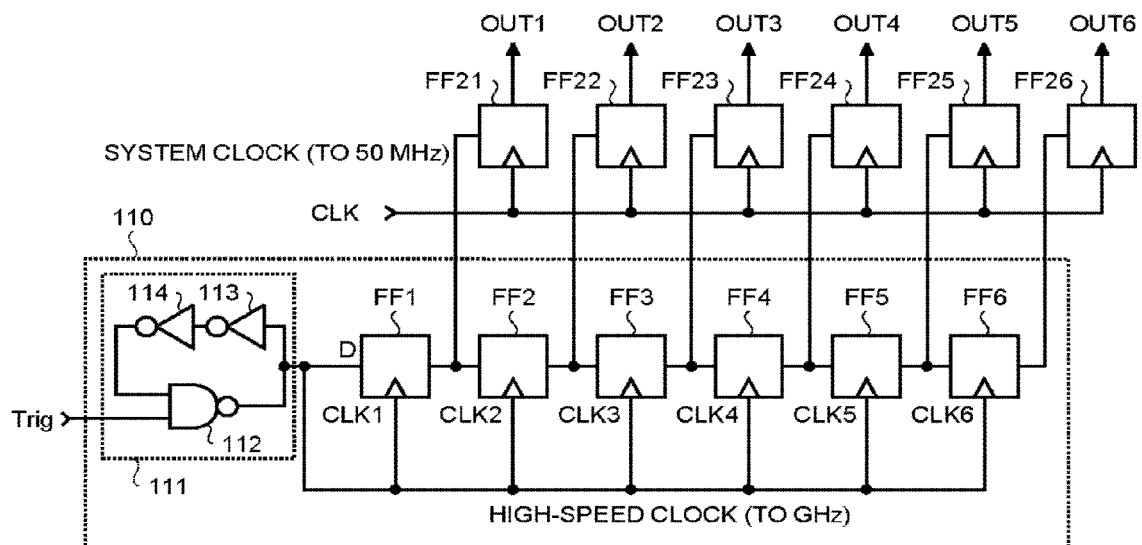
FIG. 2 is a diagram illustrating an example of a PUF generating circuit according to a second embodiment.

FIG. 2 is a diagram illustrating an example of the PUF generating circuit according to a second embodiment. In FIG. 2, the identical configuration to the first embodiment is referred to by the same reference numerals and the related explanation is not repeated.

As illustrated in FIG. 2, a PUF generating circuit 110 according to the second embodiment includes a ring oscillator 111 in place of the ring oscillator 101 in an identical configuration to the PUF generating circuit 100 illustrated in FIG. 1. The ring oscillator 111 includes an inverted AND (NAND) circuit 112 and includes two inverter circuits 113 and 114 in direct connection.

The NAND circuit 112 enables use of a trigger signal Trig, which is input from outside, in obtaining data. Meanwhile, the two inverter circuits 113 and 114 may not be disposed. In that case, to the input of the NAND circuit 112, a clock signal can be input in place of the output of the inverter 114.

However, there are cases, such as a case of configuring a field programmable gate array (FPGA), in which it is desirable to embed the inverter circuits as a resistor-transfer level (RTL).

Figure 3:
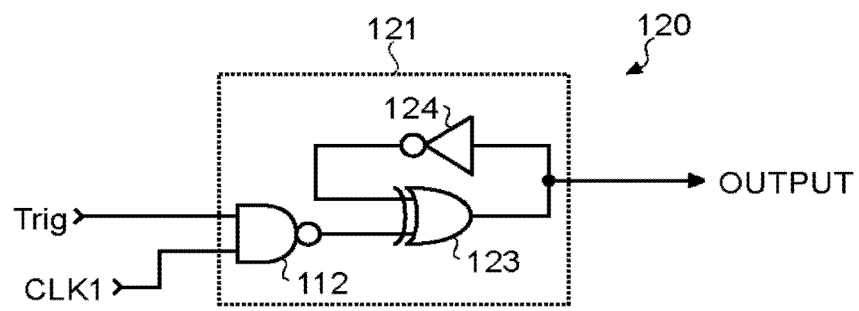
FIG. 3 is a diagram illustrating a modification example of the PUF generating circuit according to the second embodiment.

In FIG. 3 is illustrated a modification example of the ring oscillating circuit 111 according to the second embodiment.

A ring oscillator 121 includes the NAND circuit 112, an exclusive OR (XOR) circuit 123, and an inverter circuit 124. To one input of the NAND circuit 112, a trigger signal is input from outside in an identical manner to the example illustrated in FIG. 2. To the other input of the NAND circuit 112, a system clock CLK1 is input.

Figure 4:
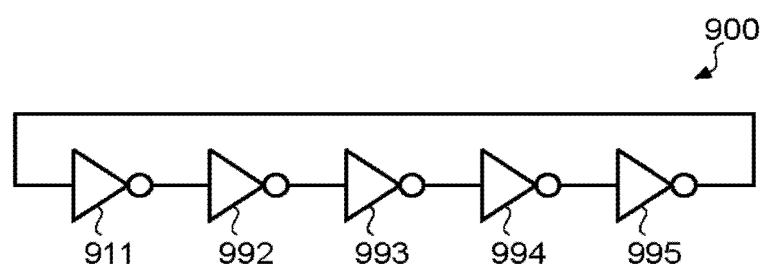
FIG. 4 is a diagram illustrating another example of a ring oscillator according to the second embodiment.
Figure 5:
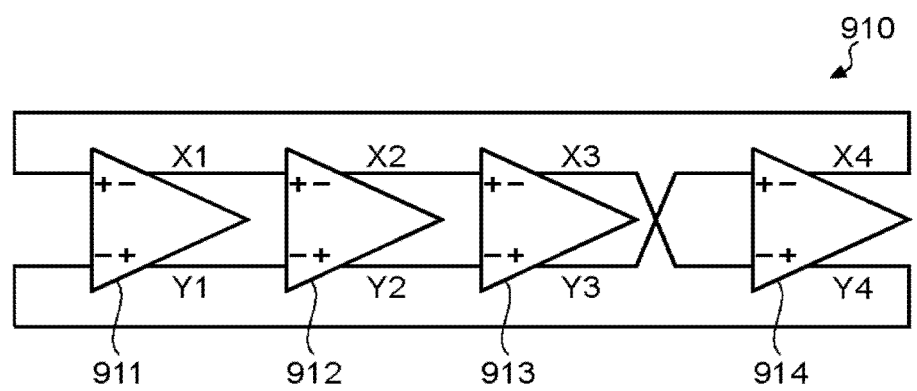
FIG. 5 is a diagram illustrating still another example of the ring oscillator according to the second embodiment.

In FIGS. 4 and 5 are illustrated examples of commonly-used ring oscillators that can be an alternative for the ring oscillator according to the second embodiment. A ring oscillator 900 illustrated in FIG. 4 includes an odd number of inverters 991 to 995 in direct connection. The ring oscillator 900 can include a minimum of one inverter circuit. A ring oscillator 910 illustrated in FIG. 5 includes an even number of differential ring oscillators 911 to 914 in direction connection. However, the two input terminals of the differential ring oscillator 914, which is positioned at the last stage, has a reversed connection relationship as compared to the other differential ring oscillators 911 to 913.

Figures 6, 7:
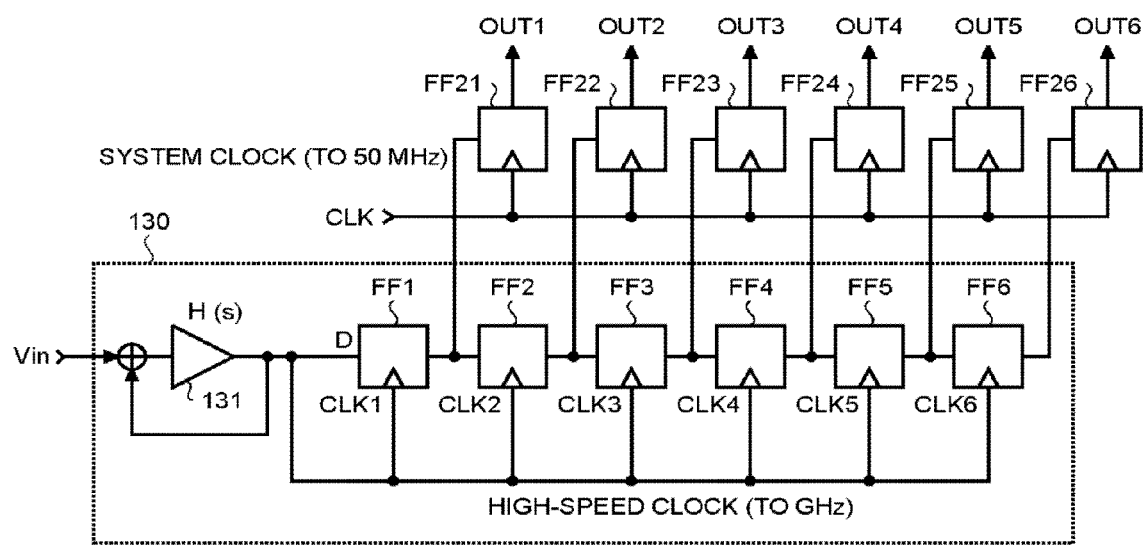
FIG. 6 is a diagram illustrating an example of PUF data that is actually obtained in the PUF generating circuit according to the second embodiment or according to the modification example of the second embodiment.
FIG. 7 is a diagram illustrating an example of a PUF generating circuit according to a third embodiment.

In FIG. 6 is illustrated an example of the PUF data that is actually obtained in the PUF generating circuit according to the second embodiment or according to the modification example of the second embodiment. In FIG. 6 is illustrated 64-bit PUF data that is obtained using 16 PUF generating circuits 110 (120). As illustrated in FIG. 6, the PUF data output from the 16 PUF generating circuits 110 varies purely for each PUF generating circuit 110.

Third Embodiment

FIG. 7 is a diagram illustrating an example of a PUF generating circuit according to a third embodiment. As illustrated in FIG. 7, a PUF generating circuit 130 according to the third embodiment includes a voltage-controlled oscillator (VCO) 131, in which a feedback circuit is used, in place of the ring oscillator 101 in an identical configuration to the PUF generating circuit 100 illustrated in FIG. 1. To the VCO 131 is applied a voltage obtained by synthesizing an external control voltage Vin with the output voltage of the VCO 131.

In this way, if the VCO 131 having a feedback circuit is used as the ring oscillator 101 illustrated in FIG. 1, even when there is a change in the external environment (such as temperature), it becomes possible to vary the frequency according to the change. That enables the PUF generating circuit 130 to output the same ID regardless of the changes in the external environment.

Figure 8:
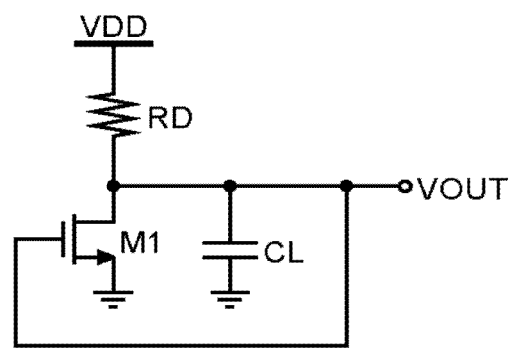
FIG. 8 is a diagram illustrating an example of a voltage-controlled oscillator (VCO)
Figure 9:
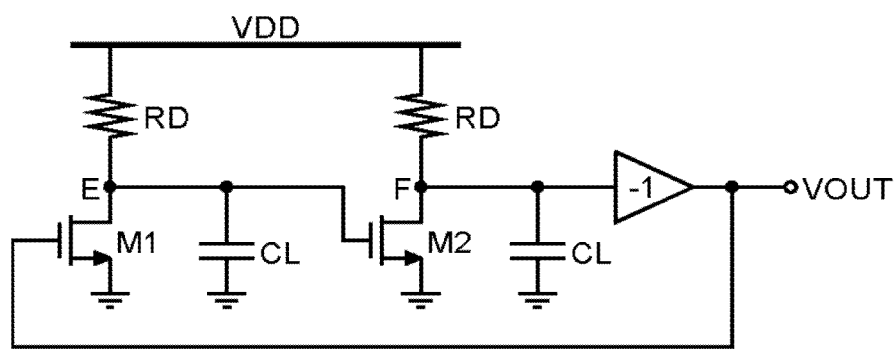
FIG. 9 is a diagram illustrating another example of a VCO.
Figure 10:
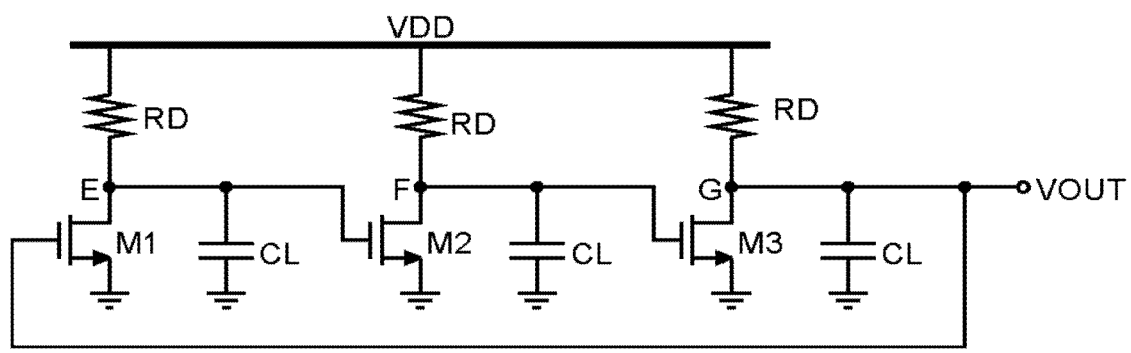
FIG. 10 is a diagram illustrating still another example of a VCO.

In FIGS. 8 to 10 are illustrated examples of commonly-used VCOs. In the examples illustrated in FIGS. 8 to 10, ring-oscillator-based VCOs are illustrated because it is desirable that an ID generator has as small dimensions as possible. In an ID generating circuit having no restrictions on the dimensions, a ring oscillator can be replaced with an LC oscillator in which inductance is put to effective use.

Fourth Embodiment

Figure 11:
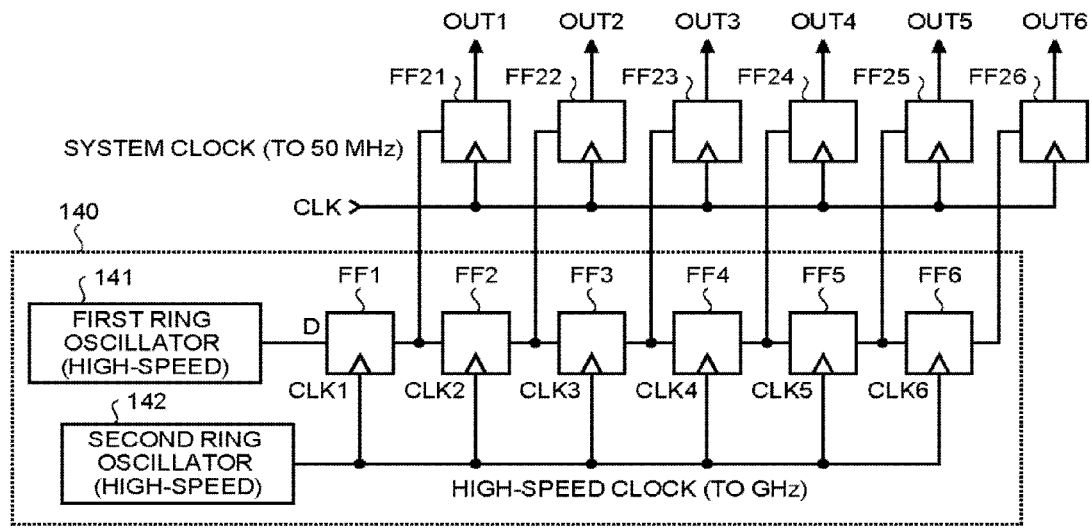
FIG. 11 is a diagram illustrating an example of a PUF generating circuit according to a fourth embodiment.

FIG. 11 is a diagram illustrating an example of a PUF generating circuit according to a fourth embodiment. As illustrated in FIG. 11, a PUF generating circuit 140 according to the fourth embodiment includes two ring oscillators 141 and 142, each of which outputs signals of a higher frequency as compared to, for example, the system clock.

Of the two ring oscillators 141 and 142, the output of the second ring oscillator 142 is input to the clock terminals CLK1 to CLK6, which determine the input values to the flip-flop circuits FF1 to FF6, respectively. As a result, in a short period of time in which the inversion operation of the first ring oscillator 141 is performed about once, it becomes possible to obtain an initial eigenvalue of the first ring oscillator 141.

As far as the design is concerned, the second ring oscillator 142 either can have the same frequency as the first ring oscillator 141, or can have a somewhat lower frequency than the first ring oscillator 141. Herein, a somewhat lower frequency can be, for example, a frequency obtained by adding a buffer configured with two inverters to the second ring oscillator 142. As a result of adding such a buffer, the oscillation frequency of the second ring oscillator 142 becomes somewhat slower, thereby making it possible to obtain a greater number of values output from the first ring oscillator 141.

However, greater the number of added buffers, greater becomes the vulnerability to the effect of the external environment such as temperature. For that reason, it is desirable to have only a small number of added buffers. Moreover, if the VCO 131 identical to that illustrated in FIG. 7 is used in the two ring oscillators 141 and 142, it becomes possible to configure a PUF generating circuit that is more robust against the changes in the external environment such as temperature.

Fifth Embodiment

Figure 12:
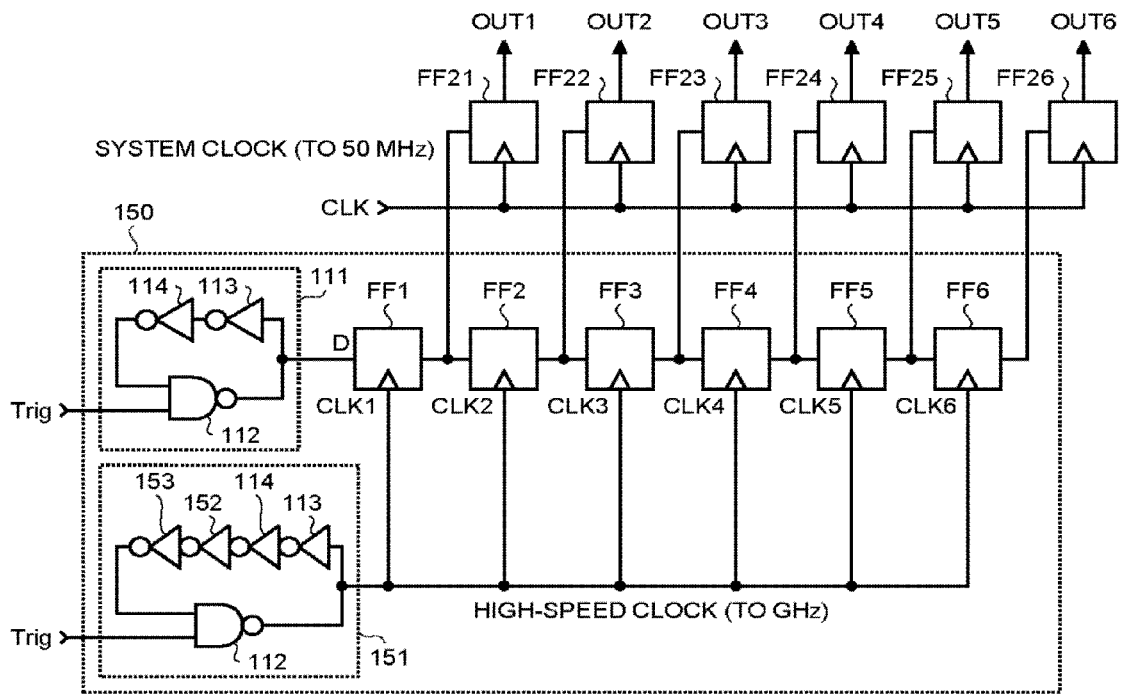
FIG. 12 is a diagram illustrating an example of a PUF generating circuit according to a fifth embodiment.

FIG. 12 is a diagram illustrating an example of a PUF generating circuit according to a fifth embodiment. As illustrated in FIG. 12, a PUF generating circuit 150 according to the fifth embodiment includes a first ring oscillator 111 and a second ring oscillator 151, which have the configuration of a typical ring oscillator, as the first ring oscillator 141 and the second ring oscillator 142, respectively, in the PUF generating circuit 140 illustrated in FIG. 11. The first ring oscillator 111 can have an identical configuration to the ring oscillator 111 illustrated in FIG. 12. The second ring oscillator 151 has a configuration in which, for example, two inverters 152 and 153 are added to a configuration identical to the first ring oscillator 111. Moreover, in order to enable selection of the number of actually-operating inverters in the second ring oscillator 151, a selector circuit having a multiplexer can also be installed in the second ring oscillator 151.

In FIG. 13 is illustrated an example of the PUF data that is actually obtained in the PUF generating circuit according to the fifth embodiment. In FIG. 13 is illustrated 64-bit PUF data that is obtained using 16 PUF generating circuits 150. As illustrated in FIG. 13, the PUF data output from the 16 PUF generating circuits 150 varies purely for each PUF generating circuit 150. Moreover, as compared to the example illustrated in FIG. 10, it can be seen that the PUF data has a greater degree of complexity.

In FIG. 14 is illustrated an example of a conventional random number generating circuit as a comparison example. In FIG. 15 are illustrated are examples of oscillation waveforms output from a first ring oscillator 921 and a second ring oscillator 922 installed in the random number generating circuit illustrated in FIG. 14. In the random number generating circuit illustrated in FIGS. 14 and 15, in order to ensure the randomness of data, in the design of the first ring oscillator 921 having a higher frequency, the frequency that is set to be the intended oscillation frequency (hereinafter, called a design frequency) needs to be largely different than the design frequency of the second ring oscillator 922 that performs sampling. This large mismatch in the frequencies represents a necessary configuration for the purpose of randomly extracting the values output from the first ring oscillator 921.

As compared to the conventional random number generating circuit illustrated in FIGS. 14 and 15, one of the differences in the PUF generating circuit 150 illustrated in FIG. 12 according to the fifth embodiment is that the probability of obtaining the same data pattern through an error correcting circuit is, for example, 70% or more in the case of the PUF generating circuit 150. That is because the flip-flop circuits FF1 to FF6 that obtain data have a structure enabling acquisition of more minute data than the system clock. Meanwhile, error correction mentioned herein can be performed using the BCH code (BCH stands for Bose-Chaudhari-Hocquenghem) or the Reed-Solomon code.

Sixth Embodiment

Figure 16:
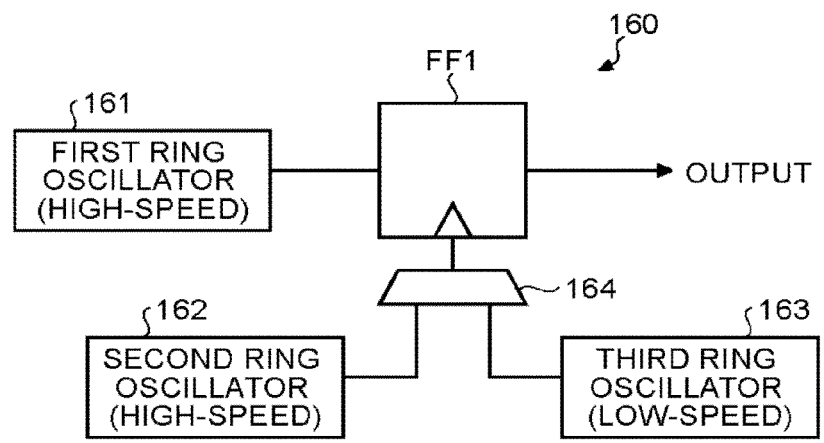
FIG. 16 is a diagram illustrating an example of a PUF generating circuit according to a sixth embodiment.

FIG. 16 is a diagram illustrating an example of a PUF generating circuit according to a sixth embodiment. A PUF generating circuit 160 illustrated in FIG. 16 includes the circuit according to any one of the embodiments described above as well as includes a random number generating circuit. More particularly, the PUF generating circuit 160 includes two ring oscillators 161 and 162 having a relatively high frequency, includes a ring oscillator 163 having a relatively low frequency, and includes the flip-flop circuit FF1. The first ring oscillator 161 and the second ring oscillator 162 can be the ring oscillators according to any one of the embodiments described above.

As explained with reference to FIGS. 14 and 15, in a random number generating circuit, when the design frequencies of two ring oscillators differ in a large way, it is possible to obtain random values. In that regard, in the sixth embodiment, the output of the two ring oscillators 162 having a relatively high frequency and the output of the third ring oscillator 163 having a relatively low frequency are connected using a selector 164. Herein, the number of oscillators connectible using the selector 164 is not limited to two, and can be equal to or greater than three.

During the operations of the PUF generating circuit 160, for example, an ID is generated using the PUF data that is initially obtained when the first ring oscillator 161 to the third ring oscillator 163 are switched ON. At that time, the selector 164 is set to select the second ring oscillator 162. Once a predetermined period of time (for example, about 100 cycles in the system clock) elapses since switching ON the first ring oscillator 161 to the third ring oscillator 163, the selector 164 changes selection to the third ring oscillator 163.

Figure 17:
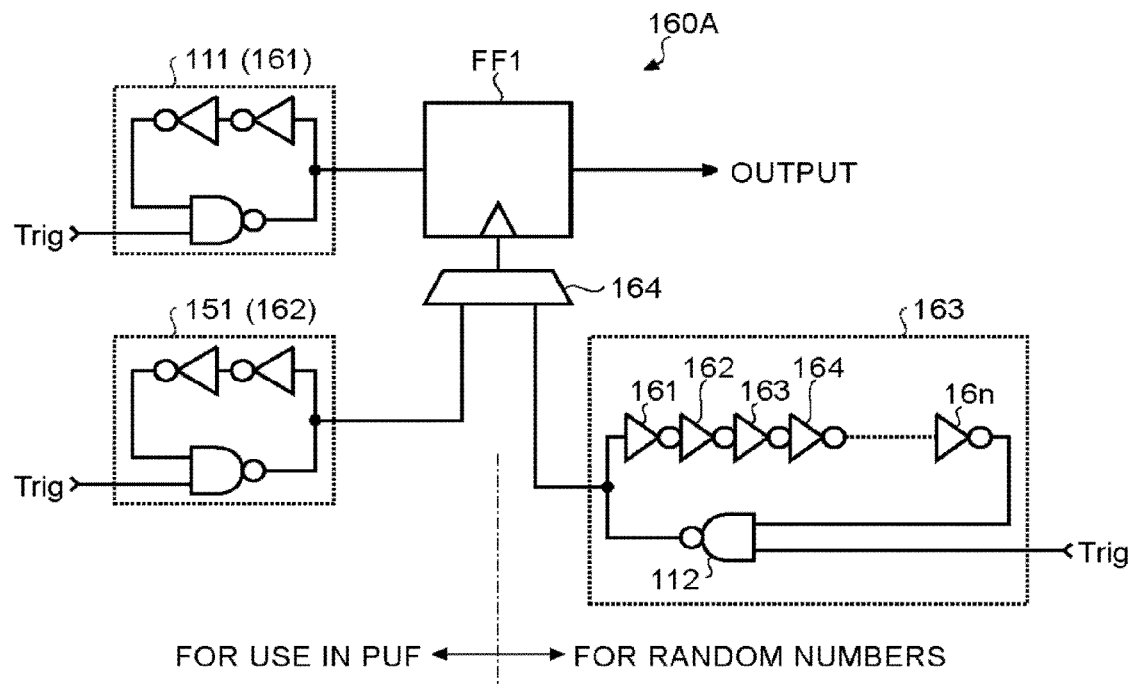
FIG. 17 is a diagram illustrating a configuration example of a PUF generating circuit that includes one of the ring oscillators mentioned above.
Figure 18:
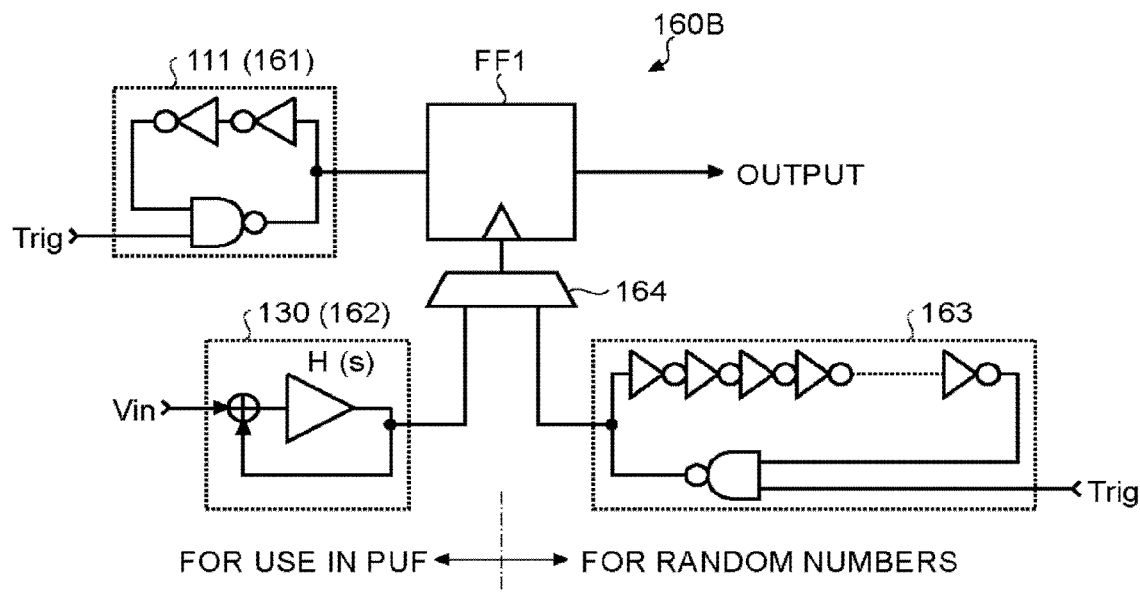
FIG. 18 is a diagram illustrating another configuration example of the PUF generating circuit that includes one of the ring oscillators mentioned above.
Figure 19:
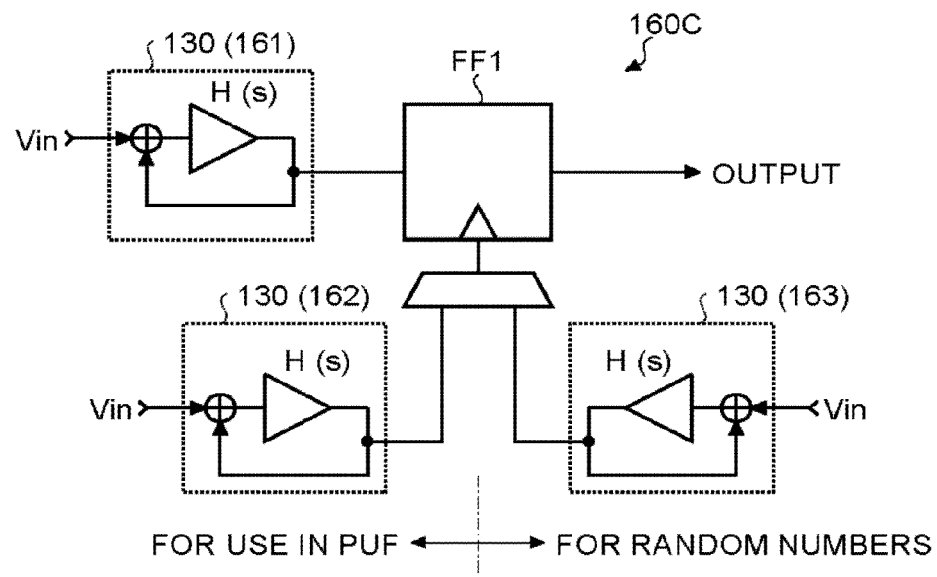
FIG. 19 is a diagram illustrating still another configuration example of the PUF generating circuit that includes one of the ring oscillators mentioned above.

In FIGS. 17 to 19 are illustrated configuration examples of the PUF generating circuit 160 that includes the ring oscillator according to any one of the embodiments described above.

In FIG. 17 is illustrated an example in which the first ring oscillator 111 and the second ring oscillator 151 according to either the first embodiment or the fifth embodiment are used as the first ring oscillator 161 and the second ring oscillator 162, respectively. In the ring oscillator 163, inverter circuits 165 to 16n that are greater in number than in the second ring oscillator 151 are added to the first ring oscillator 111.

In FIG. 18 is illustrated an example in which the VCO 131, in which a feedback circuit is used, according to the third embodiment is used as the second ring oscillator 162. The first ring oscillator 161 and the third ring oscillator 163 can be identical to the first ring oscillator 161 and the third ring oscillator 163, respectively, illustrated in FIG. 18.

In FIG. 19 is illustrated an example in which the VCO 131, in which a feedback circuit is used, according to the third embodiment is used as each of the first ring oscillator 161 to the third ring oscillator 163. However, the control voltage Vin that is input to each of the ring oscillators 161 to 163 is appropriately set according to the corresponding oscillation frequency.

Seventh Embodiment

In a seventh embodiment, the explanation is given about a data generating device that is configured by combining a random number generating circuit and a PUF generating circuit.

Figure 20:
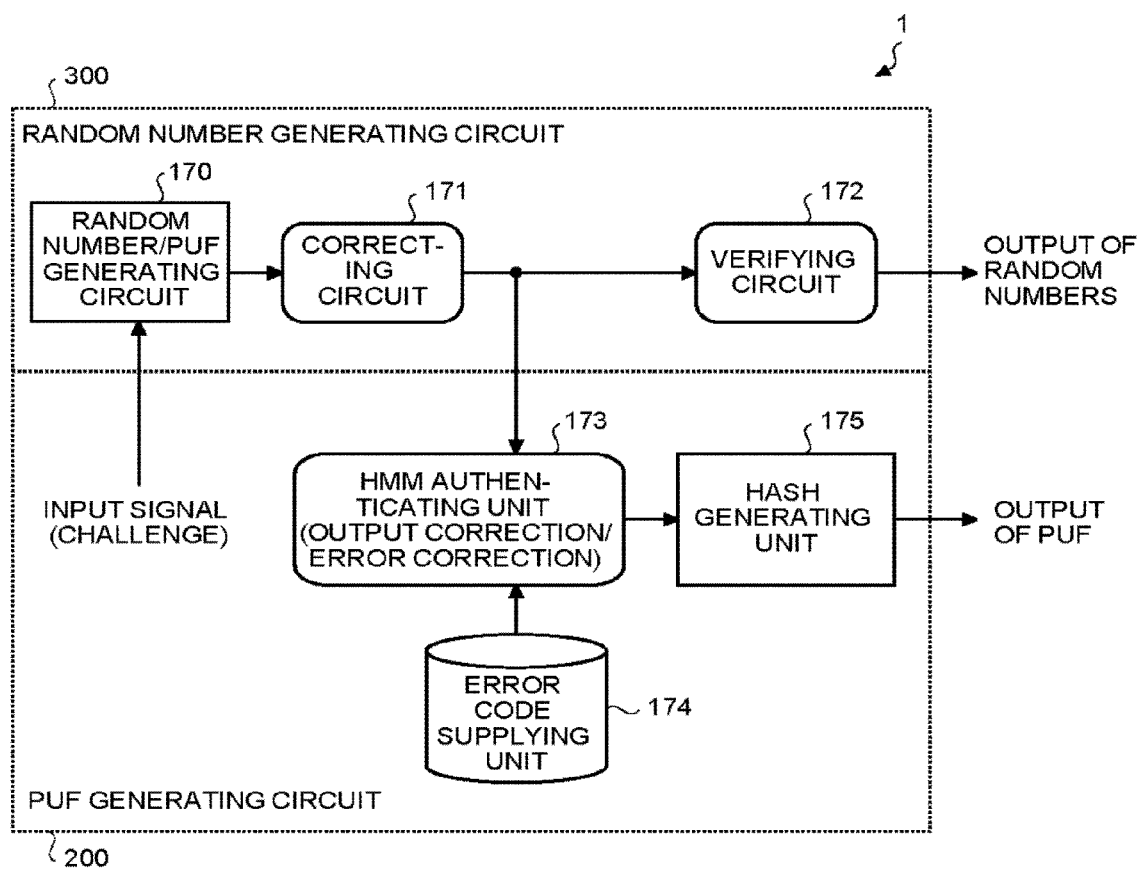
FIG. 20 is a block diagram illustrating an exemplary overall configuration of a data generating device according to a seventh embodiment.

FIG. 20 is a block diagram illustrating an exemplary overall configuration of the data generating device according to the seventh embodiment. As illustrated in FIG. 20, a data generating device 1 includes a random number generating circuit 300 and a PUF generating circuit 200. In this configuration, the PUF generating circuit according to any one of the embodiments described above is equivalent to a random number/PUF generating circuit 170, which can be disposed in the random number generating circuit 300, for example. Moreover, the random number generating circuit 300 can include a correcting circuit 171 and a verifying circuit 172. The PUF generating circuit 200 can include an HMM authenticating unit 173 in which the hidden Markov model (HMM) is used; an error code supplying unit 174; and a hash generating circuit 175.

To the correcting circuit 171 is input the output (OUTPUT) of the random number/PUF generating circuit 170. The correcting circuit 171 can mix the data of several ring oscillators by performing bit shifting, or can equalize the data in the same ring oscillator using flip-flop circuits.

The verifying circuit 172 performs frequency verification in which, for example, the frequency of appearance of the random numbers is subjected to chi-square verification; and outputs random numbers.

The HMM authenticating unit 173 is an example of a generating unit for generating IDs. The HMM authenticating unit 173 performs HMM correction with respect to the PUF data output from the correcting circuit 171, and has an output correction/error correction function that attaches an error correction code supplied by the error code supplying unit 174 and outputs the result.

The hash generating circuit 175 generates a cryptographic key by attaching a hash function to the output from the HMM authenticating unit 173, and outputs the cryptographic key.

Eighth Embodiment

Figure 21:
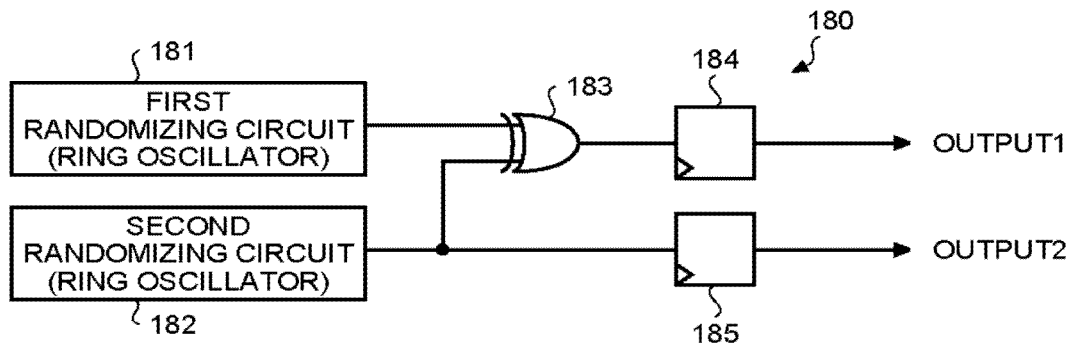
FIG. 21 is a diagram illustrating an example of a PUF generating circuit according to an eighth embodiment.

FIG. 21 is a diagram illustrating an example of a PUF generating circuit according to an eighth embodiment. As illustrated in FIG. 21, a PUF generating circuit 180 according to the eighth embodiment has a configuration in which the outputs of two randomizing circuits 181 and 182 is connected without using a flip-flop circuit. Instead, the outputs of the two randomizing circuits 181 and 182 are connected using, for example, an XOR circuit 183. With such a configuration, the outputs of the two randomizing circuits 181 and 182 are electrically coupled by hard-wiring. As a result, the two randomizing circuits 181 and 182 behave in the same way in response to temperature change, thereby enabling achieving reduction in the effect of the external environment such as temperature change.

Ninth Embodiment

Figure 22:
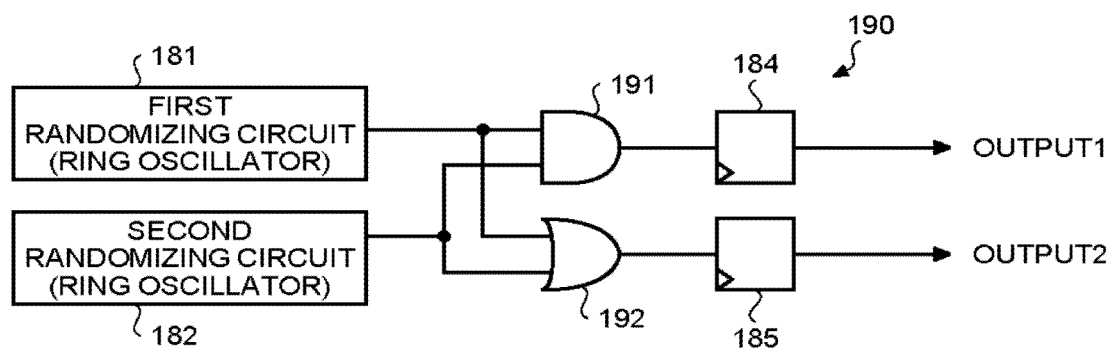
FIG. 22 is a diagram illustrating an example of a PUF generating circuit according to a ninth embodiment.

FIG. 22 is a diagram illustrating an example of a PUF generating circuit according to a ninth embodiment. In a PUF generating circuit 190 illustrated in FIG. 22, the outputs of the two randomizing circuits 181 and 182 are connected using an AND circuit 191 and an OR circuit 192 in place of the XOR circuit 183 in an identical configuration to the PUF generating circuit 180 illustrated in FIG. 21. With such a configuration, in an identical manner to the eighth embodiment, the outputs of the two randomizing circuits 181 and 182 are electrically connected by hard-wiring. That enables achieving reduction in the effect of the external environment such as temperature change. Meanwhile, aside from using the AND circuit 191 and the OR circuit 192 in place of the XOR circuit 183, it is alternatively possible to use any type of two input circuits such as NAND circuits or NOR circuits.

Figure 23:
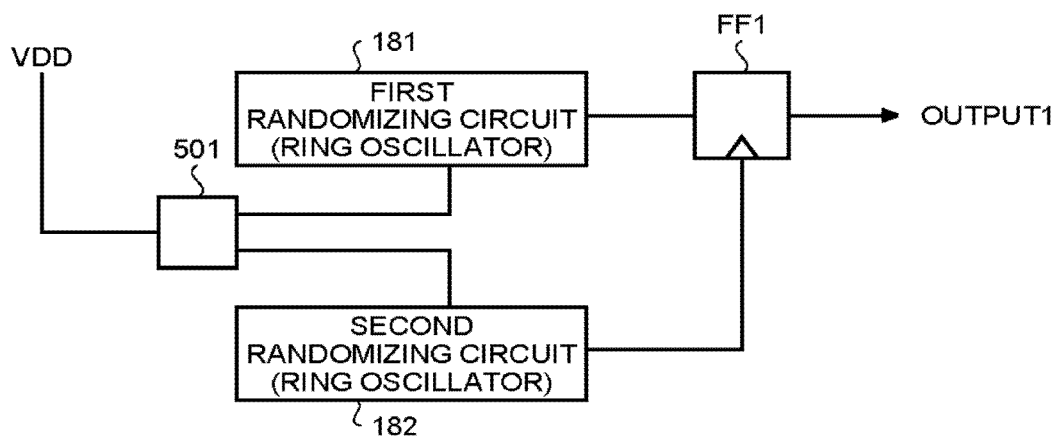
FIGS. 23 to 29 are diagrams illustrating still other examples of the PUF generating circuit according to the ninth embodiment.

In FIGS. 23 to 29 are illustrated other configuration examples in which the two randomizing circuits 181 and 182 are electrically coupled. In FIG. 23 is illustrated an example in which the two randomizing circuits 181 and 182 are electrically coupled using a circuit element 501. As far as the circuit element 501 is concerned, it is possible to use, for example, an AND circuit, an OR circuit, a NAND circuit, or an XOR circuit.

Figure 24:
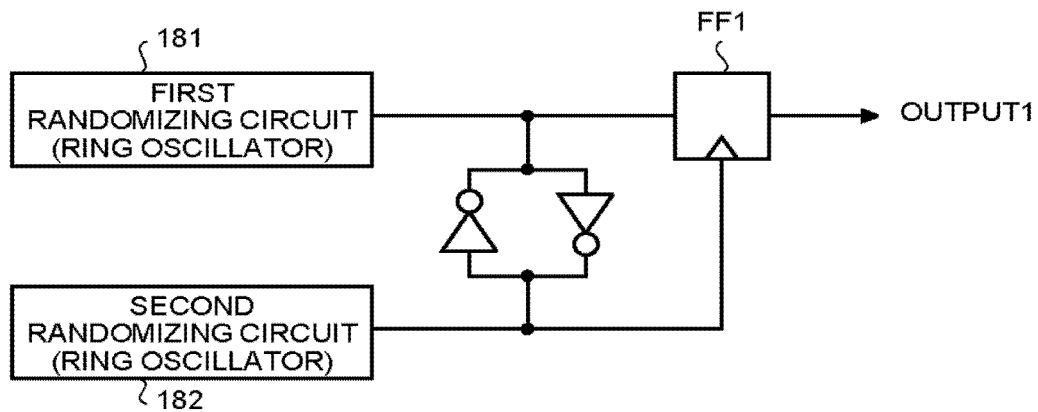
Figure 25:
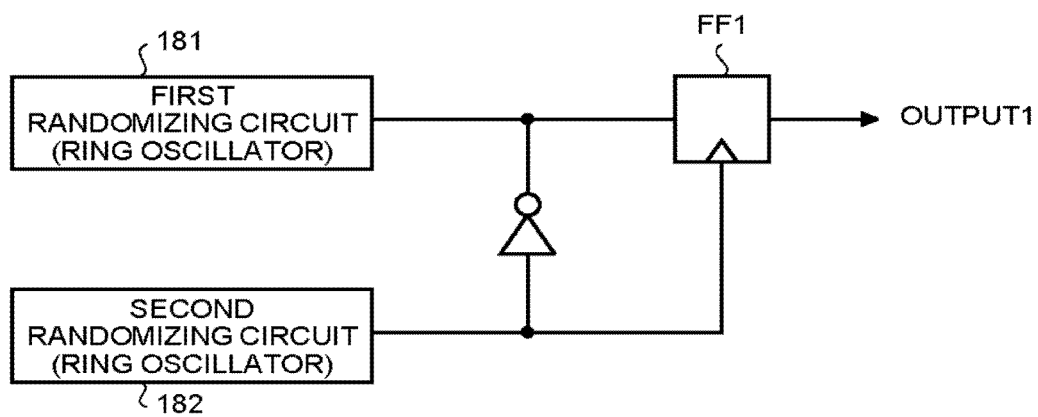
Figure 26:
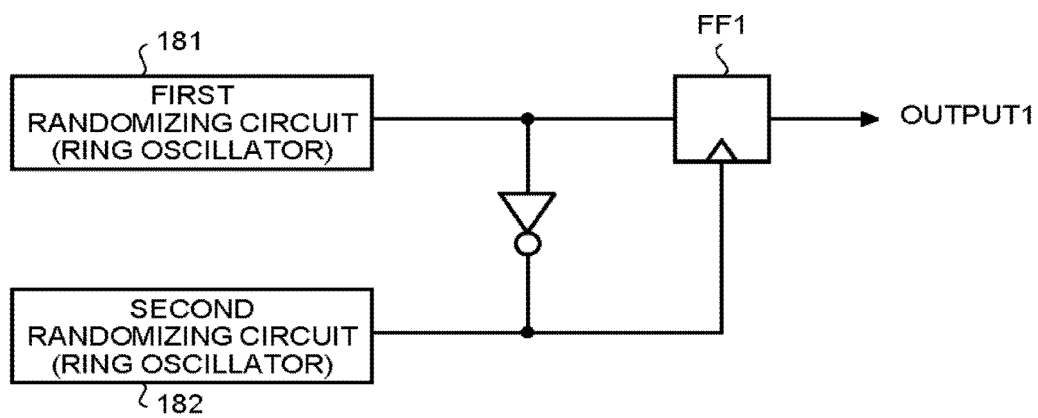
Figure 27:
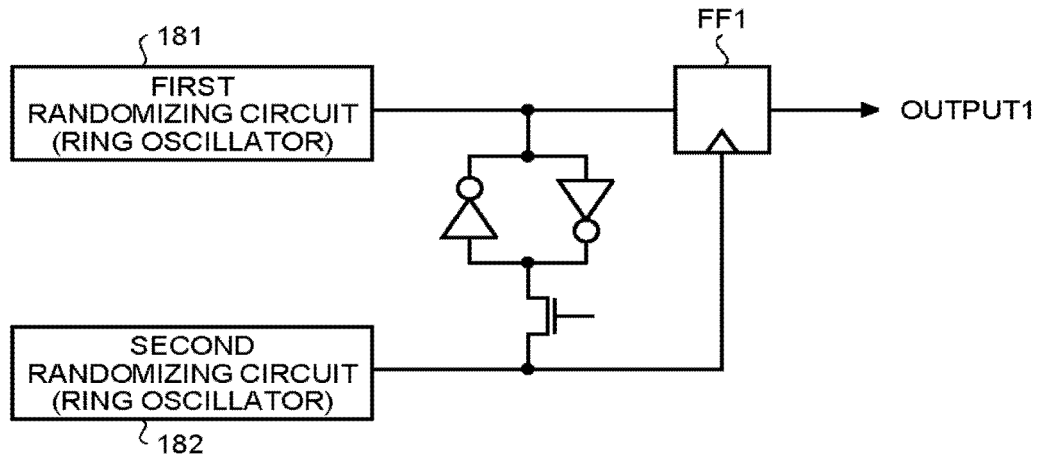
Figure 28:
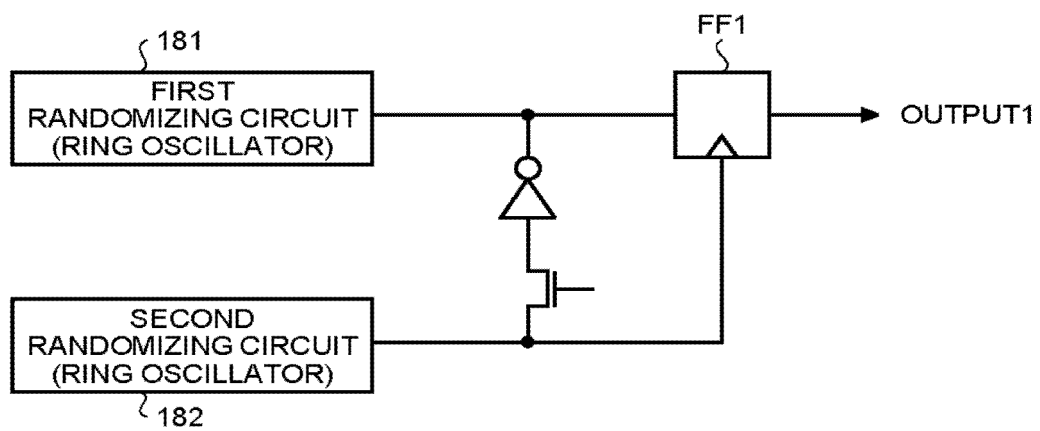
Figure 29:
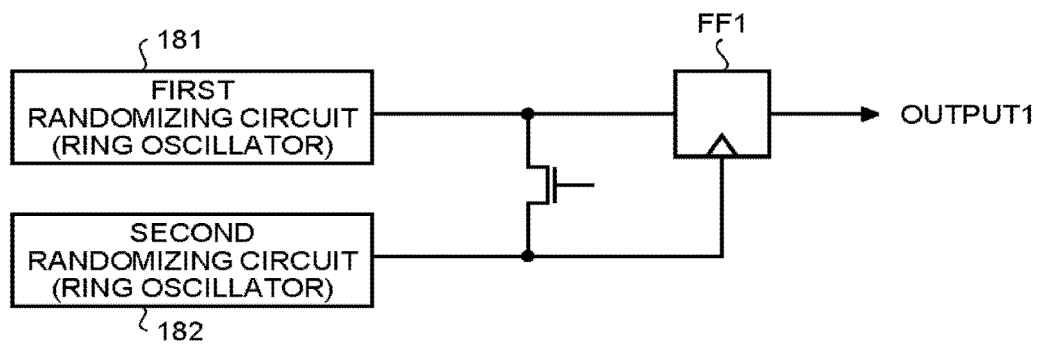

FIGS. 24 to 26 are diagrams illustrating examples in which the two randomizing circuits 181 and 182 are coupled either via coupled inverters (see FIG. 24), or are coupled via an inverter (see FIG. 25), or are coupled directly (see FIG. 26). Moreover, as illustrated in FIGS. 27 to 29, a switch such as a transistor can be installed in hard-wiring for the purpose of electrically coupling the two randomizing circuits 181 and 182 illustrated in the configurations illustrated in FIGS. 24 to 26.

Furthermore, if the layout is such that the output portions of the two randomizing circuits 181 and 182 are placed adjacent to each other, then two randomizing circuits 181 and 182 can alternatively be coupled in a capacitative manner.

As described above, as a result of electrically coupling the randomizing circuits 181 and 182, it becomes possible to configure a PUF generating circuit that is robust against temperature changes.

10-th Embodiment

Figure 30:
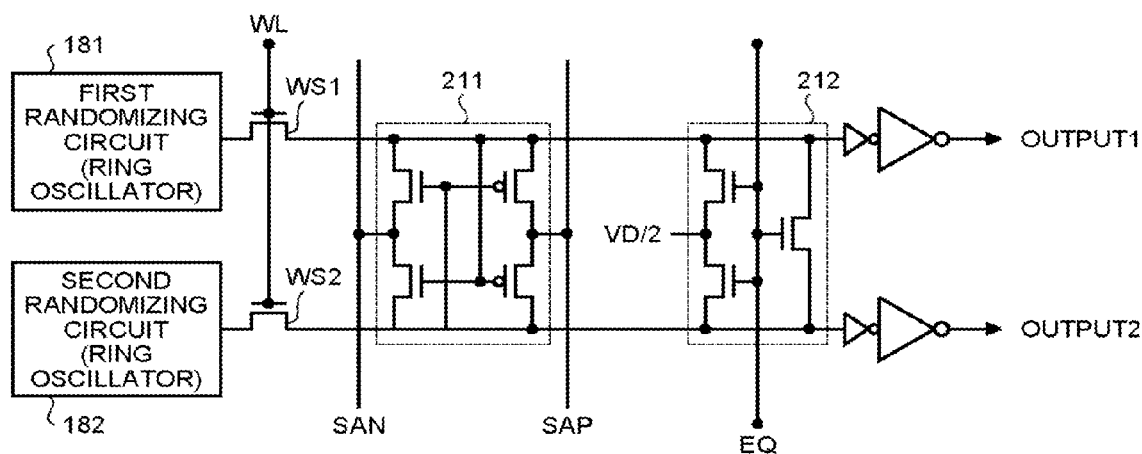
FIG. 30 is a diagram illustrating an example of a PUF generating circuit according to a 10-th embodiment.
Figure 31:
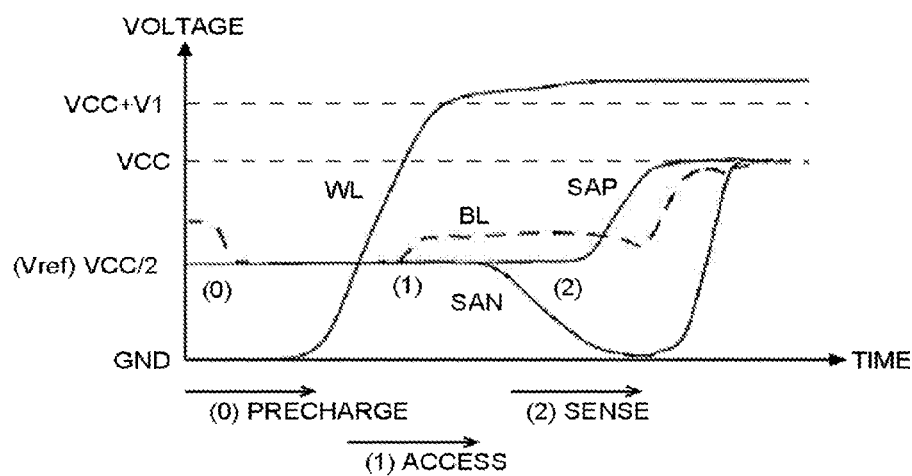
FIG. 31 is a diagram illustrating an example of operations performed by the PUF generating circuit illustrated in FIG. 30.

FIG. 30 is a diagram illustrating an example of a PUF generating circuit according to a 10-th embodiment. In a PUF generating circuit 210 illustrated in FIG. 30, the outputs of the two randomizing circuits 181 and 182 are directly connected, and a sense amplifier circuit 211 is inserted so that the output results of the two randomizing circuits 181 and 182 contradict each other. In FIG. 31 is illustrated an example of operations performed by the PUF generating circuit illustrated in FIG. 30. As illustrated in FIG. 31, in the PUF generating circuit 210, firstly, a voltage equalizer 212 is switched ON so as to equalize ((0) PRECHARGE) the electrical potential of the hard-wiring connected to the output of each of the randomizing circuits 181 and 182. That is followed by switching ON word line switches WS1 and WS2 that are installed in the hard-wiring of the two randomizing circuits 181 and 182, respectively; and the two randomizing circuits 181 and 182 are operated. As a result, the outputs of the two randomizing circuits 181 and 182 get coupled ((1) ACCESS). Then, the sensor amplifier circuit 211 is switched ON so as set the outputs of the two randomizing circuits 181 and 182 to either "0" or "1" ((2) SENSE). That enables achieving the outputs of the randomizing circuits 181 and 182 with more accuracy.

11-th Embodiment

Figure 32:
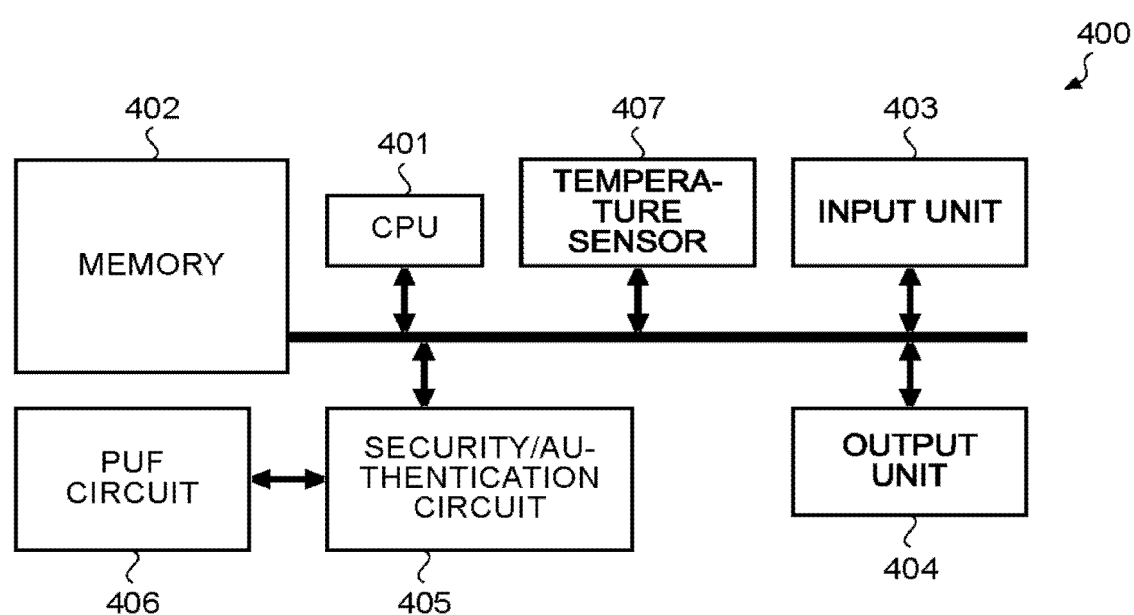
FIG. 32 is a diagram illustrating an exemplary overall configuration of an electronic device, which includes an authentication system, according to an 11-th embodiment.

In FIG. 32 is illustrated an exemplary overall configuration of an electronic device, which includes an authentication system, according to an 11-th embodiment. As illustrated in FIG. 32, an electronic device 400 includes a central processing unit (CPU) 401, a memory 402 such as a static random access memory (SRAM), an input unit 403, an output unit 404, a security/authentication circuit 405, a PUF circuit 406, and a temperature sensor 407. The PUF circuit 406 can include the PUF generating circuit according to any one of the embodiments described above. An input signal (a challenge) that serves as the trigger for starting authentication is output as an instruction from the CPU 401 to the security/authentication circuit 405. Upon receiving the input signal (the challenge), the security/authentication circuit 405 accesses the PUF circuit 406 and obtains information about the ID from the PUF circuit 406. The obtained information about the ID is taken in the server side (a response) via the output unit 404. Then, in the server, ID authentication is performed by collating the changes in the estimated defect variability.

12-th Embodiment

Figure 33:
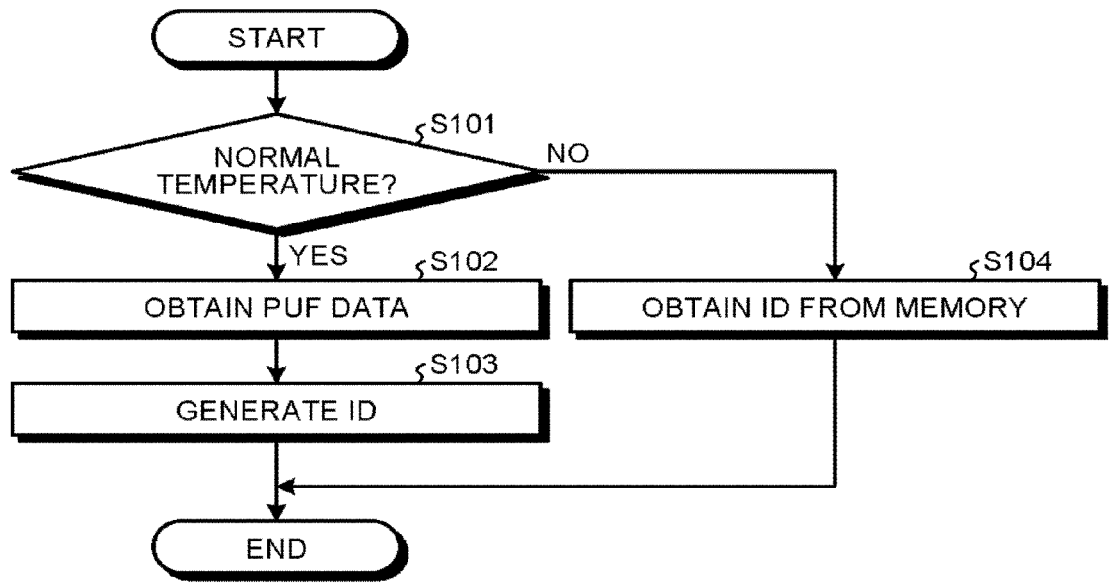
FIG. 33 is a diagram illustrating an example of operations performed by an electronic device according to a 12-th embodiment.

Explained below with reference to FIG. 33 is an example of operations performed by an electronic device according to a 12-th embodiment. The electronic device according to the 12-th embodiment can be identical to the electronic device 400 illustrated in FIG. 32.

As illustrated in FIG. 33, during booting, the CPU 401 of the electronic device 400 obtains temperature information from the temperature sensor 407, and determines whether or not the temperature information is indicating normal temperature (Step S101). When the temperature information is indicating normal temperature, it implies that the temperature information is indicating a temperature within a temperature range in which stable PUF data can be obtained from the PUF circuit 406. The temperature range can be about 25° C.±110° C. If the temperature information is indicating normal temperature (Yes at Step S101), then the CPU 401 outputs an input signal (a challenge), which serves as the trigger for starting authentication, to the security/authentication circuit 405; obtains PUF data from the security/authentication circuit 405 (Step S102); and generates an ID using the PUF data (Step S103).

However, if the temperature information is not indicating normal temperature (No at Step S101), the CPU 401 obtains the ID by referring to the memory 402 (Step S104). The memory 402 is used to store in advance the ID generated during normal temperature. The ID obtained at Step S103 or Step S104 is taken in the server side (a response). Then, in the server, ID authentication is performed by collating the changes in the estimated defect variability. As a result, even if there is a change in temperature representing the external environment, the ID can be output in a stable manner.

13-th Embodiment

Figure 34:
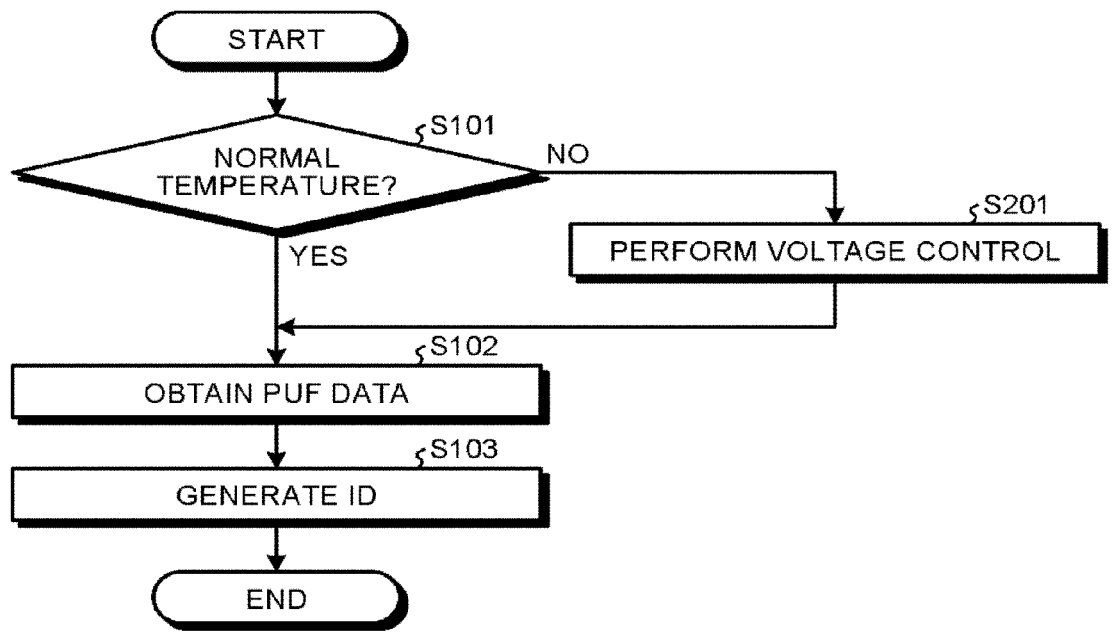
FIG. 34 is a diagram illustrating an example of operations performed by an electronic device according to a 13-th embodiment.

Explained below with reference to FIG. 34 is an example of operations according to a 13-th embodiment. An electronic device according to the 13-th embodiment can be identical to the electronic device 400 illustrated in FIG. 32. However, from among the PUF circuits according to the embodiments described above, a PUF circuit 406 used in the 13-th embodiment has the ring oscillator including a VCO. Meanwhile, the identical steps to those in the example of operations illustrated in FIG. 12 are referred to by the same step numbers.

As illustrated in FIG. 34, during booting, the CPU 401 of the electronic device 400 obtains temperature information from the temperature sensor 407, and determines whether or not the temperature information is indicating normal temperature (Step S101). If the temperature information is indicating normal temperature (Yes at Step S101), then the CPU 401 outputs an input signal (a challenge), which serves as the trigger for starting authentication, to the security/ authentication circuit 405; obtains PUF data from the security/authentication circuit 405 (Step S102); and generates an ID using the PUF data (Step S103).

However, if the temperature information is not indicating normal temperature (No at Step S101), then the CPU 401 controls the voltage value of the voltage applied to the VCO of the ring oscillator in such a way a value close to the PUF data during normal temperature is obtained (Step S201). Then, the CPU 401 performs the operations at Steps S102 and S103, and generates an ID using the PUF data. As a result, even if there is a change in temperature representing the external environment, the ID can be output in a stable manner. Meanwhile, in the memory 402, the voltage value used in obtaining a value close to the PUF data during normal temperature can be stored in advance with respect to, for example, each set of temperature information obtained by the temperature sensor 407.

14-th Embodiment

Figure 35:
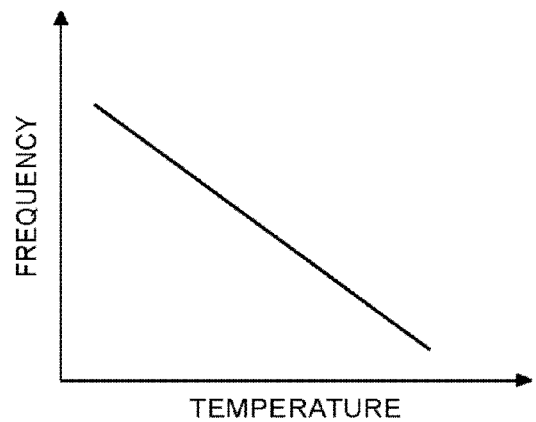
FIG. 35 is a diagram illustrating a relationship between the oscillation frequency of a ring oscillator and the temperature.

FIG. 35 is a diagram illustrating a relationship between the oscillation frequency of a ring oscillator and the temperature. As illustrated in FIG. 35, generally, the oscillation frequency of a ring oscillator decreases accompanying an increase in the temperature. The fact that the oscillation frequency of a ring oscillator changes depending on the temperature implies that the ID output by the PUF generating circuit in which the concerned ring oscillator is used changes depending on the temperature. In the embodiments described above, the explanation is given for a case in which the frequency is varied according to the changes in the external environment such as temperature. In a 14-th embodiment, the explanation is given for a case in which the ID that has changed according to the temperature change is registered in the server and is used during authentication.

Figure 36:
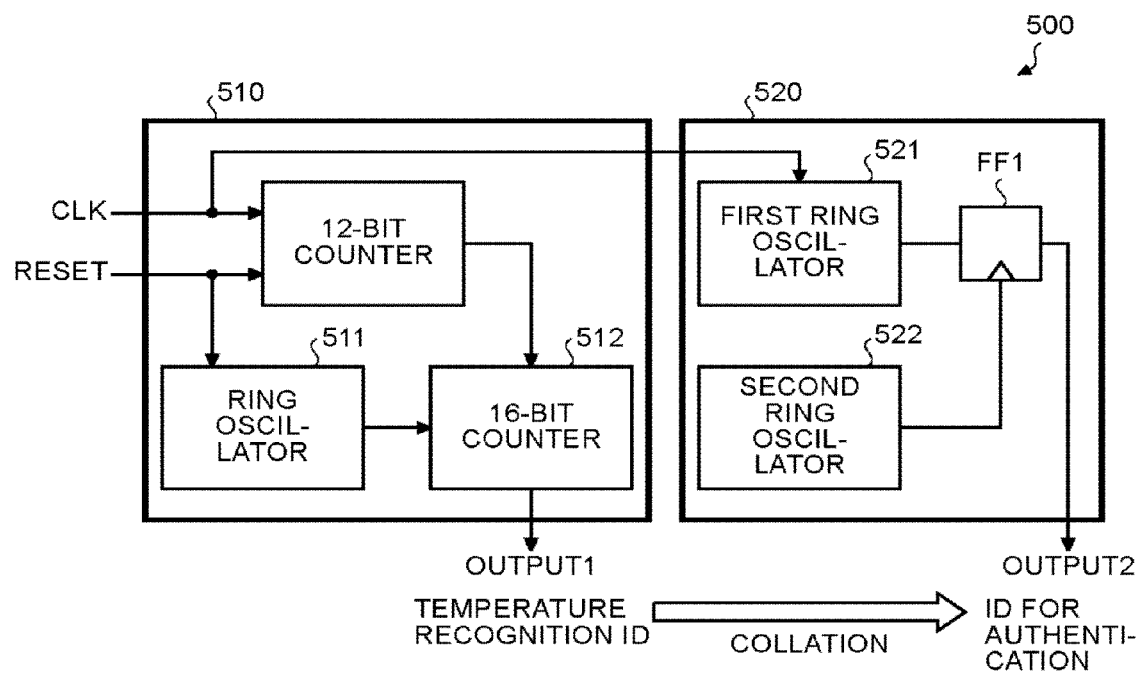
FIG. 36 is a block diagram illustrating an exemplary overall configuration of a data generating device according to a 14-th embodiment.

FIG. 36 is a block diagram illustrating an exemplary overall configuration of a data generating device according to the 14-th embodiment. As illustrated in FIG. 36, a device 500 includes a temperature measuring device 510, the output of which changes according to the temperature at which a chip is placed; and includes a data generating device 520 configured with two ring oscillators 521 and 522. In the temperature measuring device 510 that measures the temperature at which a chip is placed, not only the abovementioned temperature sensor such as a diode can be used, but also a ring oscillator 511 illustrated in FIG. 36 can be used. In that case, firstly, the server requests the device 500 for the output (temperature data) of the temperature measuring device 510 corresponding to the temperature and for the ID generated by the data generating device 520. The data generating device in which the ring oscillator 511 is used in robust to some extent against the temperature. Hence, in the server, IDs corresponding to the temperatures are recorded in advance at intervals of, for example, 5° C. to 10° C. Upon receiving the temperature data (OUTPUT1 in FIG. 36) from the device 510 and an ID (OUTPUT2 in FIG. 36) from the device 520, the server obtains the Hamming distance between the pre-recorded ID at the concerned temperature and the received ID (OUTPUT2 in FIG. 36), and authenticates the chip to be legitimate if the Hamming distance is small. With such a configuration, without having to install a feedback circuit in the device 500, ID authentication corresponding to the temperature changes can be performed with a simple configuration. Meanwhile, in FIG. 36, a coupling circuit illustrated in FIGS. 23 to 29 can be connected in between the ring oscillators 521 and 522. That makes it possible to configure an ID generating circuit that is more robust against the temperature changes.

Figure 37:
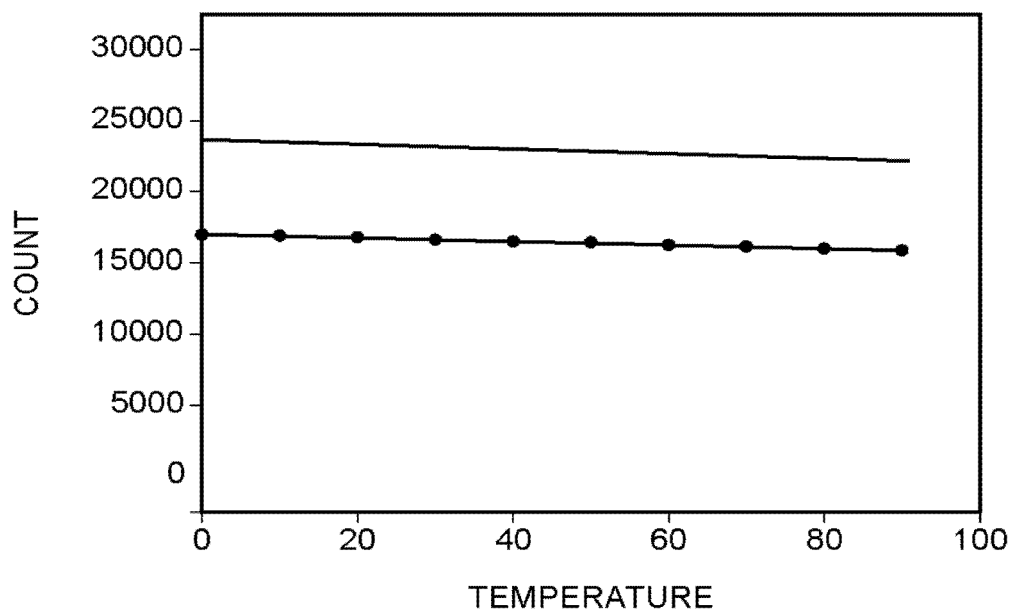
FIG. 37 is a diagram illustrating experimental data obtained by a temperature measuring device that includes a ring oscillator illustrated in FIG. 36.
Figure 38:
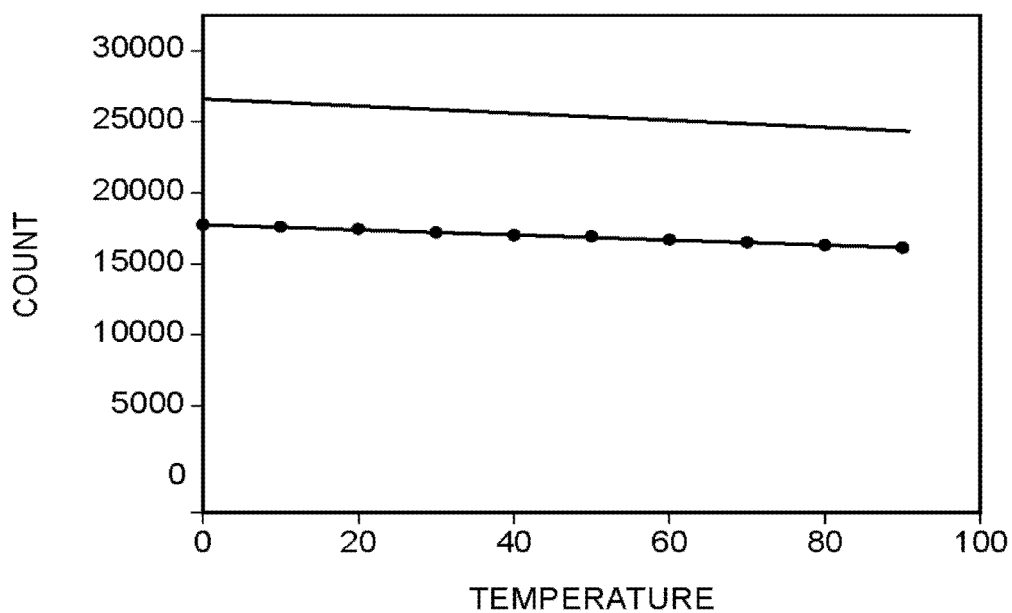
FIG. 38 is a diagram illustrating another set of experimental data obtained by the temperature measuring device that includes the ring oscillator illustrated in FIG. 36.

FIGS. 37 and 38 are diagrams illustrating experimental data in which the output values of a 16-bit counter 512, which represent the output of the temperature measuring device 510 including the ring oscillator 511 illustrated in FIG. 36, are obtained as temperature data (a function of temperature). In FIGS. 37 and 38 are illustrated the results obtained in the case of installing the temperature measuring device 510 in different devices. As illustrated in FIGS. 37 and 38, the temperatures measured by the temperature measuring devices 510 can be different for each device. That is, output values of 16-bit counter 512 each of which counts the number of outputs of a ring oscillator 511 in each device can be different from one device to another.

Figure 39:
FIG. 39 is a diagram illustrating the actual collation result obtained using a device illustrated in FIG. 36.
Figure 40:
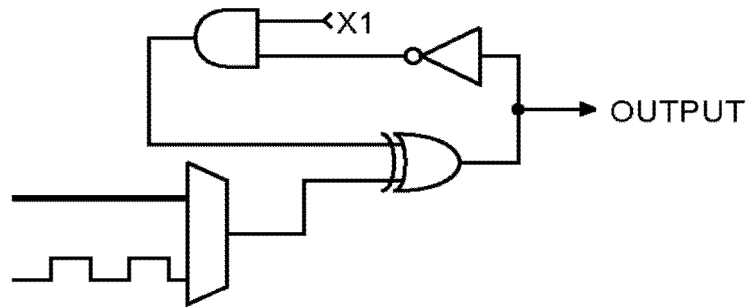
FIGS. 40 to 52 are diagrams illustrating other examples of a ring oscillator.
Figure 41:
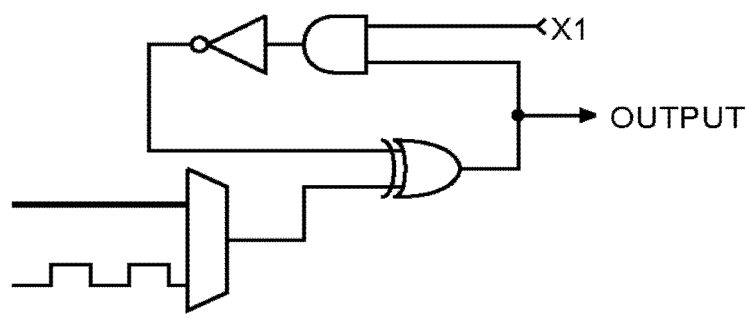
Figure 42:
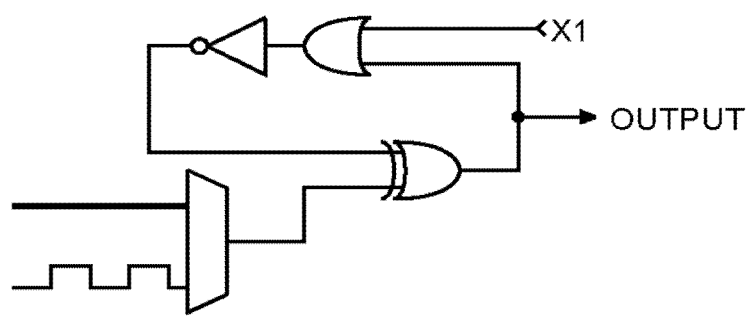
Figure 43:
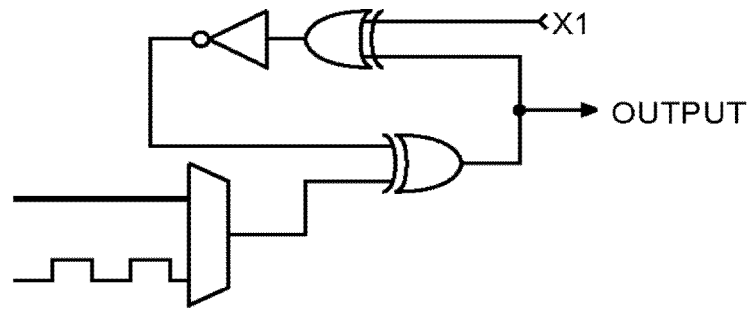
Figure 44:
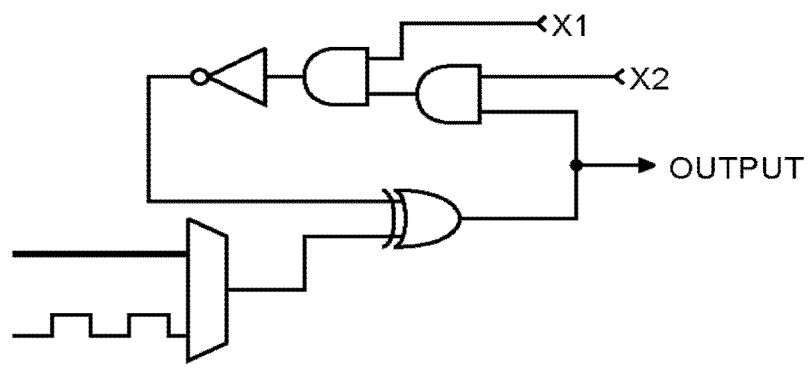
Figure 45:
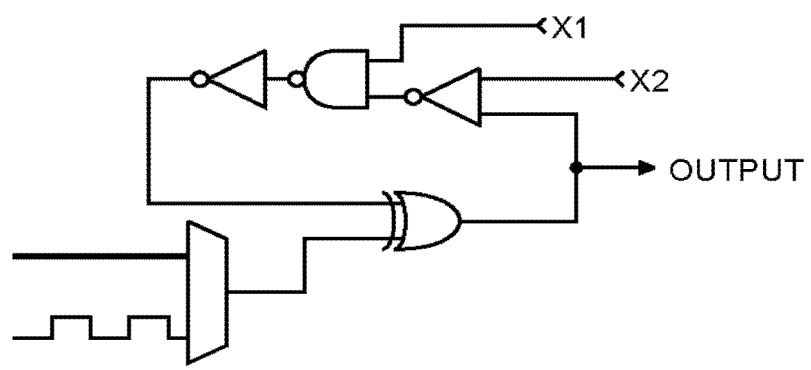
Figure 46:
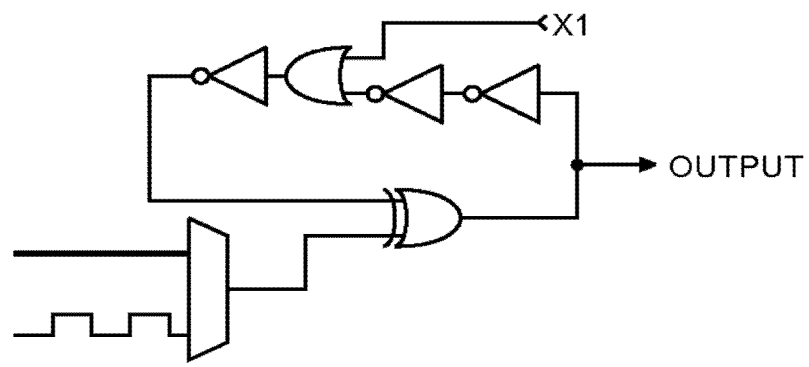
Figure 47:
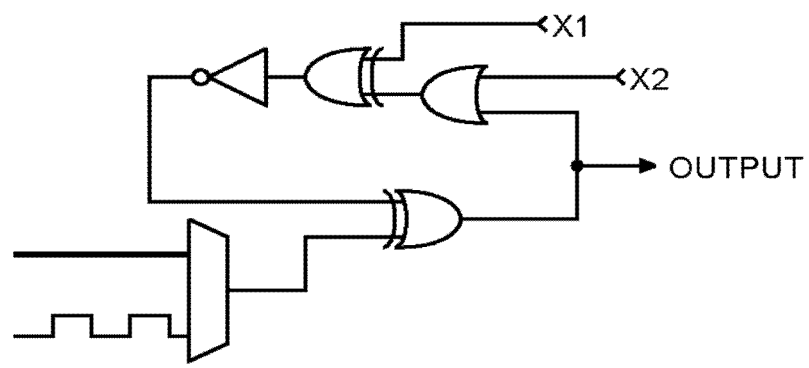
Figure 48:
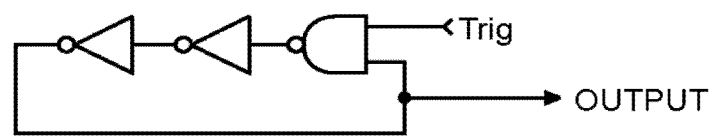
Figure 49:
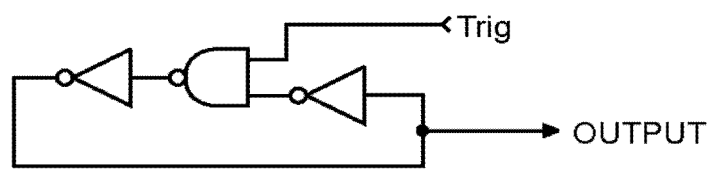
Figure 50:
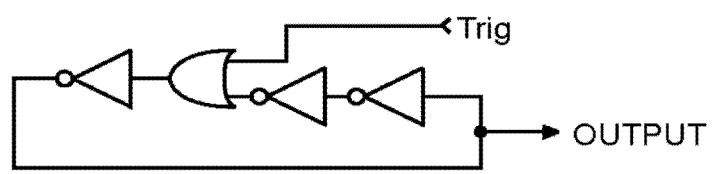
Figure 51:
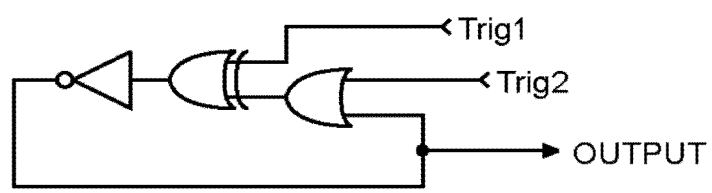

In FIG. 39 is illustrated the actual collation result obtained using the device 500 illustrated in FIG. 36. As illustrated in FIG. 39, the IDs output from the device 500 output substantially same values with respect to the temperature changes in the range of 5° to 10°. Hence, corresponding to a temperature value measured by the temperature measuring device 510 installed in each device, two IDs sandwiching the concerned temperature value are used in authentication.

In the collation using the temperature data and an ID, for example, if the ID registered corresponding to the obtained temperature and the ID actually obtained from the device 500 have the Hamming distance (the number of different counts) within 15%, that device can be authenticated to be legitimate.

15-th Embodiment

Figure 52:
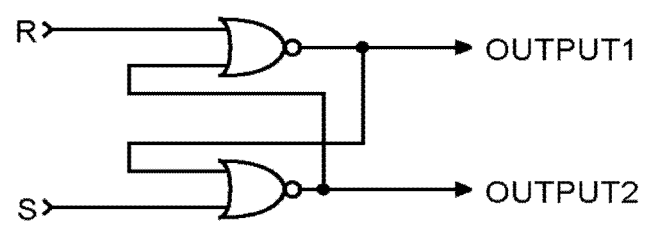

In FIGS. 40 to 52 are illustrated examples of a ring oscillator other than the examples explained earlier. Even when the ring oscillator illustrated in any one of FIGS. 40 to 52 is used, it is possible to achieve an identical effect to the effect achieved in the embodiments described above. Meanwhile, in the example illustrated in FIG. 52, an indeterminate flip-flop circuit is used, and either one of outputs OUTPUT1 and OUTPUT2 of the indeterminate flip-flop circuit can be used as the output of the ring oscillator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data generating device, comprising:
a ring oscillator;
a plurality of flip-flop circuits which are connected in series, each of which has a D terminal and a clock terminal, the flip-flop circuits including at least first to third flip-flop circuits, the first flip-flop circuit being located at a head of the series, the second flip-flop circuit being located at an end of the series, the third flip-flop circuit being located between the first and second flip-flop circuits, the D terminal of the first flip-flop circuit being directly connected to an output of the ring oscillator, an output of each of the first and third flip-flop circuits being connected to the D terminal of a flip-flop circuit following thereupon, and the clock terminals of the flip-flop circuits being directly connected to the output of the ring oscillator, respectively; and
a generator that generates a first ID for authentication based on one or more values outputted from the flip-flop circuits immediately after the ring oscillator is turned on.

2. The data generating device according to claim 1, wherein the ring oscillator is an oscillator in which oscillation frequency changes according to a voltage value of a voltage applied to the ring oscillator.

3. The data generating device according to claim 1, wherein
the ring oscillator operates at a frequency higher than that of a system clock,
each of the flip-flop circuits determines a single value of the output of the ring oscillator during a single cycle of the system clock immediately after the ring oscillator is turned on, and
the generator generates the first ID using the values determined by the flip-flop circuits.

4. The data generating device according to claim 1, wherein
the ring oscillator operates at a frequency higher than that of a system clock,
each of the flip-flop circuits determines a plurality of values of output of the ring oscillator during a plurality of cycles of the system clock immediately after the ring oscillator is turned on, and
the generator generates the first ID using average values of the plurality of values determined by the flip-flop circuits.

5. The data generating device according to claim 1, wherein the generator has an error correction function for the one or more values inputted therein.

6. An authentication system, comprising:
the data generating device according to claim 1;
a temperature sensor that detects temperature;
a memory storing a second ID associated with temperature; and
a controller that obtains the second ID from the memory for the authentication using the temperature detected by the temperature sensor when the temperature detected by the temperature sensor is not within a specific temperature range.

7. The authentication system according to claim 6, wherein the specific temperature range is a range of normal temperature.

8. An authentication system comprising:
a data generating device according to claim 2; and
a controller that adjusts the voltage value of the voltage applied to the ring oscillator.

9. The authentication system according to claim 8, further comprising a temperature sensor that detects temperature, wherein
when the temperature detected by the temperature sensor is not within a specific temperature range, the controller adjusts the voltage value of the voltage applied to the ring oscillator so that the first ID generated by the generator becomes a specific value.

10. An authentication system, comprising:
the data generating device according to claim 1;
a temperature measuring device that measures external temperature;
a memory storing a temperature and a second ID which is associated with temperature; and a controller that identifies the second ID corresponding to the external temperature measured by the temperature measuring device from the memory, and that performs authentication with respect to the data generating device using the second ID identified from the memory and the first ID obtained from the data generating device.

11. The authentication system according to claim 10, wherein
the temperature measuring device includes a ring oscillator which outputs a measurement result depending on the external temperature, and
the controller identifies the second ID corresponding to the external temperature using the measurement result.

12. A data generating device, comprising:
a first ring oscillator;
a second ring oscillator;
a plurality of flip-flop circuits which are connected in series, each of which has a D terminal and a clock terminal, the plurality of flip-flop circuits including at least first to third flip-flop circuits, the first flip-flop circuit being located at a head of the series, the second flip-flop circuit being located at an end of the series, the third flip-flop circuit being located between the first and second flip-flop circuits, the D terminal of the first flip-flop circuit being directly connected to an output of the first ring oscillator, an output of each of the first and third flip-flop circuits being connected to the D terminal of a flip-flop circuit following thereupon, and the clock terminals of the flip-flop circuits being directly connected to an output of the second ring oscillator, respectively; and
a generator that generates a first ID for authentication based on one or more values outputted from the flip-flop circuits immediately after the first ring oscillator is turned on.

13. The data generating device according to claim 12, wherein a design frequency of the second ring oscillator is equal to or smaller than three times a design frequency of the first ring oscillator.

14. The data generating device according to claim 12, wherein the first and second ring oscillators are oscillators in each of which oscillation frequency changes according to a voltage value of a voltage applied thereto, respectively.

15. The data generating device according to claim 12, wherein
the first and second ring oscillators operate at a frequency higher than that of a system clock, respectively,
each of the flip-flop circuits determines a single value of the output of the first ring oscillator during a single cycle of the system clock immediately after the first ring oscillator is turned on, and
the generator generates the first ID using the values determined by the flip-flop circuits.

16. The data generating device according to claim 12, wherein
the first and second ring oscillators operate at a frequency higher than that of a system clock, respectively,
each of the flip-flop circuits determines a plurality of values of the output of the first ring oscillator during a plurality of cycles of the system clock immediately after the first ring oscillator is turned on, and
the generator generates the first ID using average values of the plurality of values determined by the flip-flop circuits.

17. The data generating device according to claim 12, further comprising:
a third ring oscillator having a design frequency lower than those of the first ring oscillator and the second ring oscillator; and
a selector that receives first output of the second ring oscillator and second output of the third ring oscillator, and that outputs either one of the first output and the second output, wherein
to the clock terminal of the flip-flop circuits, the first output or the second output is inputted via the selector.

18. A data generating device, comprising:
a first ring oscillator;
a second ring oscillator;
a gate circuit that couples a first output of the first ring oscillator and a second output of the second ring oscillator, and that outputs a value depending on a coupling result of the first output and the second output; and
a generator that generates an ID for authentication based on the value outputted from the gate circuit immediately after the first ring oscillator is turned on.

19. A data generating device, comprising:
a plurality of ring oscillators;
a latch circuit that determines values of outputs of the plurality of ring oscillators;
a plurality of wirings each of which electrically connects the latch circuit to each of the plurality of ring oscillators; and
a generator that generates an ID for authentication based on the values outputted from the latch circuit immediately after the plurality of ring oscillators are turned on.

20. The data generating device according to claim 19, wherein the latch circuit is a flip-flop circuit.

21. The data generating device according to claim 12, wherein
the first and second ring oscillators include inverters, respectively,
a number of inverters in the second ring oscillator is equal to or greater than that in the first ring oscillator, and
a difference between the number of inverters in the second ring oscillator and a number of inverters in the first ring oscillator is equal to or less than two.

* * * * *